United States Patent [19]
Ott et al.

[11] Patent Number: 4,788,619
[45] Date of Patent: Nov. 29, 1988

[54] PROTECTIVE RELAYS AND METHODS

[75] Inventors: Matthew J. Ott, Highland; Timothy M. Wilkerson, Madison County, both of Ill.

[73] Assignee: Basler Electric Company, Highland, Ill.

[21] Appl. No.: 42,436

[22] Filed: Apr. 24, 1987

[51] Int. Cl.$^4$ .............................................. H02H 3/20
[52] U.S. Cl. .................................... 361/91; 361/62; 361/59; 361/75; 361/89; 364/483; 340/663
[58] Field of Search ................. 361/21, 35, 59, 62, 361/65, 71, 75, 86, 88, 89, 91; 340/663; 364/483

[56] References Cited

U.S. PATENT DOCUMENTS

| | | | |
|---|---|---|---|
| 3,590,326 | 6/1971 | Watson | 361/96 |
| 3,703,717 | 11/1972 | Kuster | 340/253 Y |
| 4,246,623 | 1/1981 | Sun | 361/97 |
| 4,272,816 | 6/1981 | Matsumoto | 364/483 |
| 4,420,805 | 12/1983 | Yamaura et al. | 364/184 |
| 4,428,022 | 1/1984 | Engel et al. | 361/96 |
| 4,535,409 | 8/1985 | Jindrick et al. | 364/481 |
| 4,694,374 | 9/1987 | Verbanets, Jr. | 361/91 X |
| 4,701,690 | 10/1987 | Fernandez et al. | 322/28 |

OTHER PUBLICATIONS

Elmore et al., "Overexcitation Analysis and Detection with Microprocessor-Based Relay", in *Minnesota Power Systems Conference*, 12 pp., Oct. 7-9, 1986.
ASEA, "Over-Excitation Relay Type RATUA", Edition 1, 2/76, File R, Part 1, 4 pages.
*MCS-48* TM *Family of Single Chip Microcomputers User's Manual*, Intel, Sep. 1980, Face Sheet plus pp. 1-1 thru 1-15 and 4-1 thru 4-8.
ASEA, "Type RATUB V/Hz Overexcitation Relay for Transformers", pp. 1-3, 6/30/82.
Beckwith Electric Co., "Pride Programmable Overexcitation Relay", 8 pages Specifications, 2 pages Table of Contents and pp. 1-59 of text. (pp. 54, 56, 58 absent.) 6-1982.
Meisinger et al., "An Overexcitation Relay with Inverse Time Characteristics", Pennsylvania Elec. Assoc., Relay Com. Mtg., Pittsburgh, PA, pp. 1-6, 5.25.84.
Pettigrew, "Overexcitation Protection with Microprocessor Based Volts Per Hertz Relay", Pennsylvania Elec. Assoc., Relay Com. Mtg., Allentown, PA, pp. 1-19, 1.18.85.
Basler Electric Co., "EDM 200 Exciter Diode Monitor", 4 pages, 1.85.
Westinghouse Electric Corp., "Type MVH Microprocessor Volts Per Hertz Relay", 17 pages, 5-1985.
Lakin et al., "Advanced Overexcitation Protection for Generators and Transformers", Pennsylvania Elec. Assoc., Generator Subcom. of Relay Com., pp. 1-9, 9.20.85.
Pettigrew et al., "Operating and Application Experience with a Microprocessor-Based Volts Per Hertz Relay, 40th Annual Conf. for Protective Relay Engrs., Title Page, Abstract, Table of Contents, pp. 1-27, Apr. 13-15, 1987.

*Primary Examiner*—A. D. Pellinen
*Assistant Examiner*—Derck S. Jennings
*Attorney, Agent, or Firm*—Senniger, Powers, Leavitt and Roedel

[57] ABSTRACT

Protective relay for use in an electrical power system having electrical conductors which are energizable with an AC voltage. The protective relay includes a circuit for sensing the AC voltage to produce an AC output that has zero crossings and a time period between zero crossings, a circuit for supplying an electrical signal representing a preselected pickup value of volts-per-Hertz for the relay, and a circuit responsive to the AC output and to the electrical signal for generating an electrical level as a function of both the time period and the pickup value and for producing an output signal for the relay when the AC output exceeds the electrical level. In this way, the output signal is produced when a volts-per-Hertz value of the AC voltage exceeds the preselected pickup value of volts-per-Hertz for the relay. Other protective relay apparatus and methods are also disclosed.

61 Claims, 14 Drawing Sheets

INPUT CONTROL

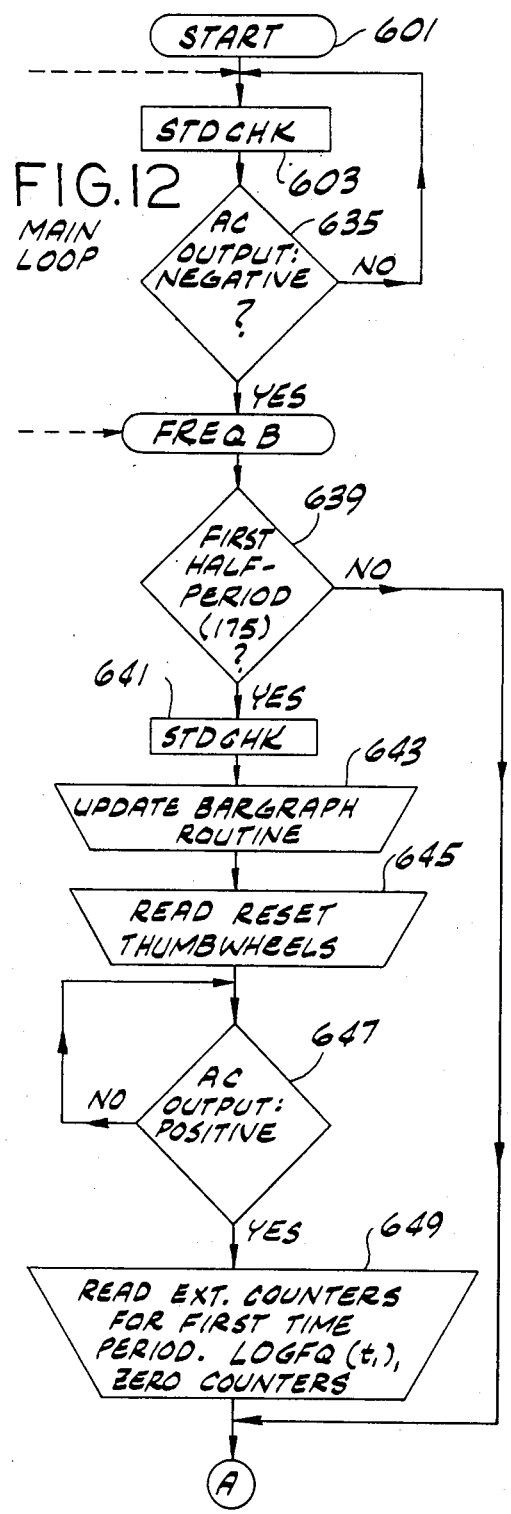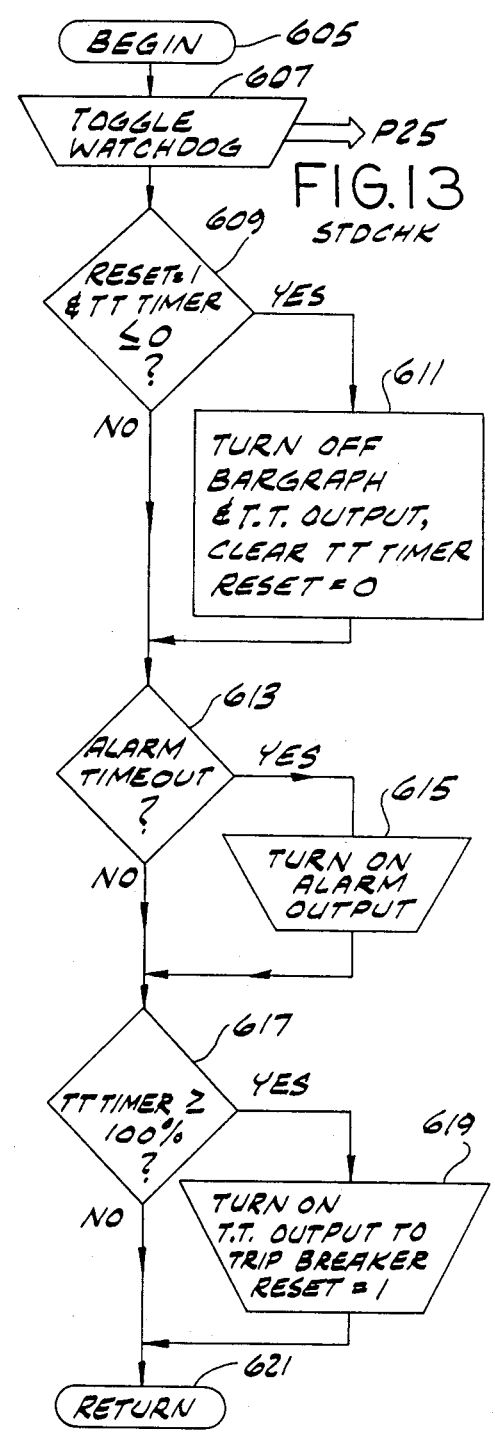

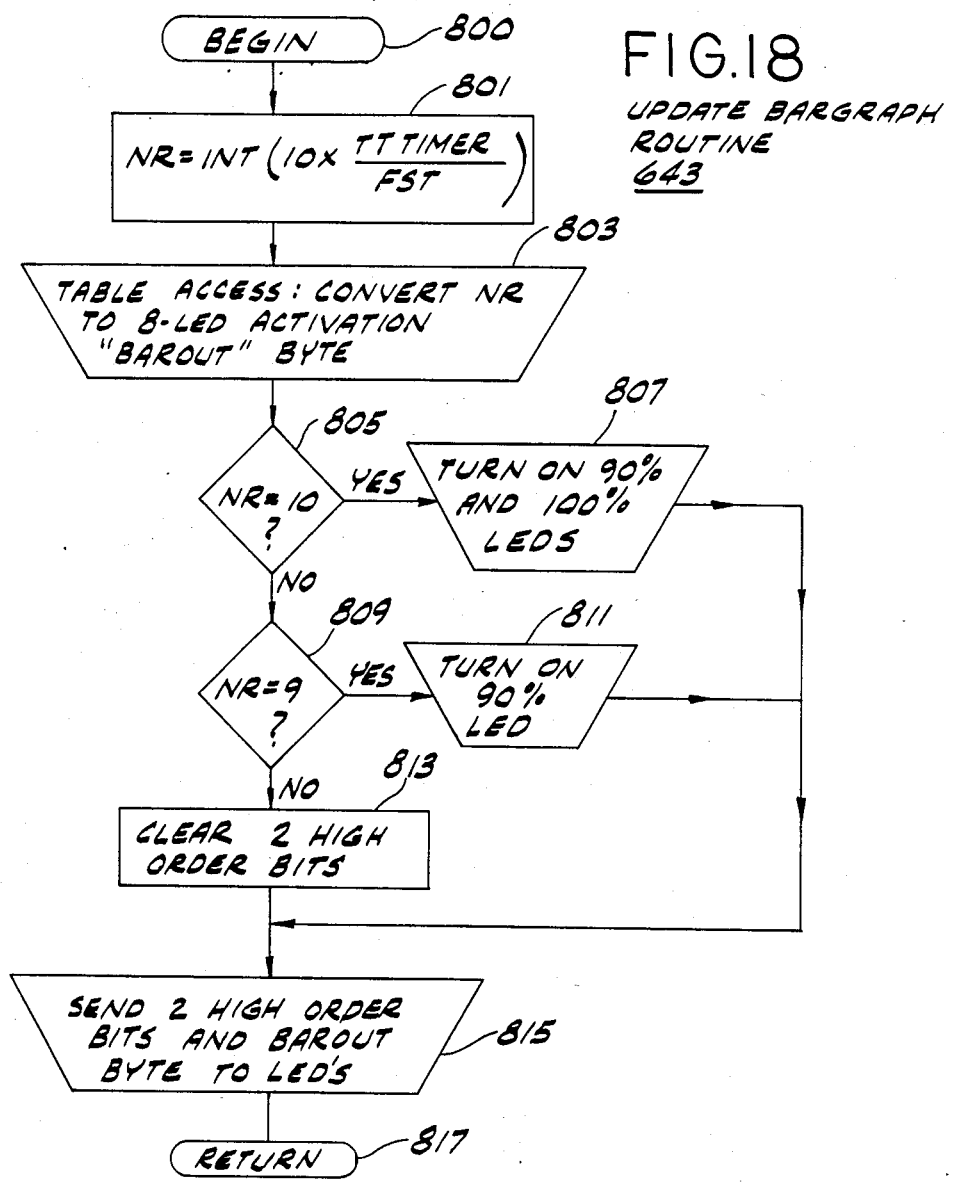

PROTECTIVE RELAYS AND METHODS

NOTICE

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

BACKGROUND OF THE INVENTION

The present invention relates to protective relay apparatus for electrical power systems and methods of such protection. More particularly, the present invention relates to overexcitation relay apparatus and methods of overexcitation protection.

Overexcitation is excessive magnetic flux density which saturates the magnetic cores of protected equipment such as generators, transformers, and iron core reactors. When a magnetic core is saturated by an alternating current (AC) source, any increase in flux density greatly increases the amount of heat generated in the core. Modern equipment designs are especially sensitive to overexcitation because they normally operate with high flux densities. Automation of substations and generating facilities is also increasing the need for overexcitation relaying.

The magnetic cores of power system equipment typically have silicon steel laminations to reduce eddy currents. However, during overexcitation the eddy currents in the core become a significant factor in the heating of the equipment. Leakage or stray flux also enters nonlaminated parts such as structural steel of the generators, transformers, and reactors to produce substantial eddy current losses there also. Overheating causes severe damage and equipment failure by deteriorating electrical insulation in the equipment.

The voltage across a winding on the magnetic core of protected equipment is, according to a basic physical principle known as Lenz's Law, proportional to the time-derivative of the flux density. Consequently, the flux density is proportional to the time-integral of the voltage across the winding. In an AC electric power system in which the voltage is essentially sinusoidal, the time integral of the voltage is, by elementary calculus, proportional to the ratio of the voltage to the frequency (in Hertz). Consequently, an overexcitation relay is also called a volts-per-Hertz (V/Hz) relay in the art. Excessive flux density can occur due to either an overvoltage condition at normal frequency, normal voltage at a reduced frequency (underfrequency) or in general an excessive value of the ratio of voltage to frequency.

One important application of V/Hz overexcitation relays is to protect directly-connected generator unit step-up transformers. These unit transformers may be subjected to overexcitation during generator startup or shutdown, power system islanding, overloads and load rejection, any of which conditions can create an underfrequency or overvoltage condition and consequent overexcitation.

For example, DC field current is typically applied to a field winding of a generator when the machine is above 90% of its rated speed. If the field current is applied early (before sufficient generator speed is reached on startup), or not removed soon enough (after generator speed has fallen substantially during shutdown), the generator AC terminal voltage may be much higher than appropriate for excitation purposes relative to the actual electrical frequency, since frequency is proportional to generator speed.

Some generators are equipped with automatic voltage regulators which supply varying amounts of DC field current to maintain the generator AC voltage at a preset value at rated frequency. The preset value is reduced by the regulator if frequency falls substantially. An overexcitation relay advantageously is provided as backup protection for underfrequency relaying and Volts/Hertz control functions in the generator voltage regulator.

In another application, load tap changing (LTC) transformers and line voltage regulators may be subjected to excessive volts-per-Hertz during abnormal system frequency conditions due to their constant voltage control function. Also, the failure of an LTC controller may result in a runaway condition producing dangerously high voltage and consequent overexcitation. An overexcitation relay associated with an LTC transformer provides overexcitation protection for the transformer while allowing a wide range of voltage control operation.

In the prior art it has been known to produce an integral of the system voltage and compare it with a preset level to determine when excessive volts-per-Hertz is present. However, the process of integrating is time-consuming, and an overexcitation relay which operates more swiftly is desirable. Also, it has been known to provide a time trip function in which a condition of excessive volts-per-Hertz causes a timer to eventually trip a circuit breaker.

During overexcitation heat accumulates in the protected equipment. When and if the overexcitation ceases, the equipment cools. It has been known to reset a volts-per-Hertz relay in a predetermined period of time after an excessive volts-per-Hertz condition has ceased regardless of the degree of excessive volts-per-Hertz and the time during which that condition has persisted. It would be desirable to provide a volts-per-Hertz relay that actually and rapidly simulates the real heating and cooling characteristics of protected apparatus.

SUMMARY OF THE INVENTION

Among the objects of the present invention are to provide improved protective relays and methods which can determine the existence of an overexcitation condition more swiftly; to provide improved protective relays and methods which can more precisely and rapidly simulate the actual heating characteristics of protected apparatus; to provide improved protective relays and methods which can more precisely and rapidly simulate the actual cooling characteristics of protected apparatus; to provide improved protective relays and methods which can avoid unnecessary tripping and consequent loss of use of protected equipment; to provide improved protective relays and methods which are more convenient in adjustment and use; and to provide improved protective relays and methods which are more reliable and economical.

Generally, one form of the invention is a protective relay for use in an electrical power system having electrical conductors which are energizable with an AC voltage. The protective relay includes a circuit for sensing the AC voltage to produce an AC output that has zero crossings and a time period between zero crossings, a circuit for supplying an electrical signal representing a preselected pickup value of volts-per-Hertz for the relay, and a circuit responsive to the AC output and to the electrical signal for generating an electrical level as a function of both the time period and the pickup value and for producing an output signal for the relay when the AC output exceeds the electrical level. In this way, the output signal is produced when a volts-per-Hertz value of the AC voltage exceeds the preselected pickup value of volts-per-Hertz for the relay.

In general, another form of the invention is a protective relay for use in an electrical power system with a circuit breaker for connecting and disconnecting first and second electrical conductors which are energizable with an AC voltage that has a value of actual volts-per-Hertz, and with means for sensing the AC voltage to produce an AC output. The protective relay includes a circuit for supplying a first electrical signal representing a preselected pickup value of volts-per-Hertz for the relay. Another circuit responds to the AC output and to the electrical signal for generating a second electrical signal which increases in magnitude during the time when the value of actual volts-per-Hertz exceeds the pickup value of volts-per-Hertz for the relay and the second electrical signal decreases in magnitude during the time when the value of actual volts-per-Hertz is less than the pickup value of volts-per-Hertz. A further circuit produces a display indicative of the magnitude of the second electrical signal as it increases and decreases in magnitude.

Generally, a further form of the invention is a protective relay for use in an electrical power system with a circuit breaker for connecting and disconnecting first and second electrical conductors which are energizable with an AC voltage that has a value of actual volts-per-Hertz. The protective relay includes a circuit for sensing the AC voltage to produce an AC output and another circuit that responds to the AC output for generating a second electrical signal that increases in magnitude from an initial value to an accumulated value when the actual volts-per-Hertz exceeds a preselected pickup level of volts-per-Hertz for the relay. A reset control signal representative of a reset rate parameter is supplied for the relay. The generating circuit includes circuitry responsive to the reset control signal for decreasing the magnitude of the second electrical signal from its accumulated value to the initial value in a reset time interval which varies directly with the accumulated value if the value of actual volts-per-Hertz is less than the pickup level of volts-per-Hertz throughout the reset time interval.

Other apparatus and method forms of the invention for achieving the above-stated and other objects of the invention are also disclosed and claimed herein.

Other objects and features will be in part apparent and in part pointed out hereinafter.

BRIEF DESCRIPTION OF THE DRAWINGS

FIGS. 12-18 are flowcharts of a main routine, interrupt routine, and subroutines in the operations and software of the inventive volts-per-Hertz relay operating according to methods of the invention.

Corresponding reference characters indicate corresponding parts throughout the several views of the drawings.

DETAILED DESCRIPTION OF PREFERRED EMBODIMENTS

Figure 1:
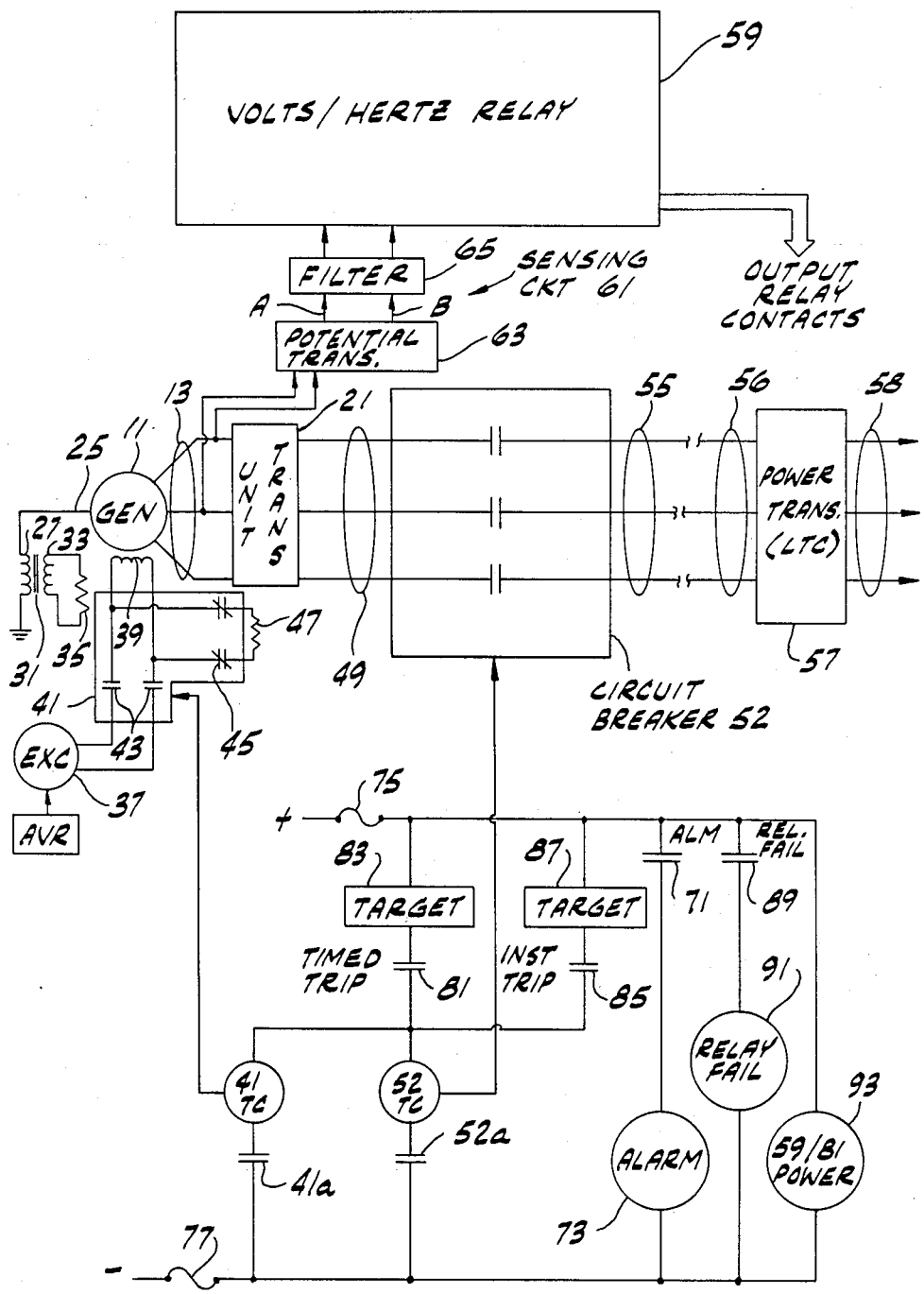
FIG. 1 is a block diagram of an electrical power system with equ protected by a volts-per-Hertz relay of the invention.

In FIG. 1, a three-phase electric power generator 11 is connected by three-phase lines 13 to a delta-wye unit stepup transformer 21. A neutral N of the generator is conventionally connected by a high resistance grounding arrangement through a primary 27 of a distribution transformer 31 to ground. The distribution transformer 31 has a secondary 33 across which is connected a grounding resistor 35. An exciter 37 produces DC current for a field winding 39 of generator 11 which controls the AC voltage produced by the generator 11 across three-phase lines 13, which AC voltage has a value of actual volts-per-Hertz.

Exciter 37 can be a shunt static exciter of electronic type such as one of the SSE type of the assignee Basler Electric Corporation, or a rotary exciter on a common shaft with generator 11, the rotary exciter in turn having a field winding which is controlled by an automatic voltage regulator AVR as shown. When necessary, a field circuit interrupter 41 disconnects exciter 37 from field winding 39 by contacts 43 and closes a set of contacts 45 to instead connect the field winding 39 to a discharge resistor 47 to rapidly reduce the AC voltage produced by generator 11 on lines 13.

Unit transformer 21 is in turn connected by three phase lines 49 through a circuit breaker 52 to a three phase bus 55 which conveys electric power to remote lines 56 to a substation load-tap-changing (LTC) power transformer 57. Circuit breaker 52 connects and disconnects the conductors of lines 49 and of bus 55 which are energizable with an AC voltage. A primary winding of LTC transformer 57 is connected to remote lines 56, and a secondary winding of transformer 57 supplies three-phase distribution lines 58.

Volts-per-Hertz protective relay 59 is an apparatus of the invention operating according to methods of the invention to advantageously act as an "intelligent" apparatus for detecting excessive volts-per-Hertz conditions in the system of generator 11 and unit transformer 21. A sensing circuit 61 includes a potential transformer (PT) 63 having a primary connected across two or more of the lines 13 to sense an AC voltage thereacross. PT 63 is represented in block form as it is suitably a system potential transformer feeding another potential sensing transformer which latter PT is associated with relay 59. A secondary output of the PT 63 is connected to a low pass filter 65 associated with relay 59 that filters the fundamental frequency of the AC voltage and suppresses its harmonics. The filter 65 produces an essentially sinusoidal AC output, which has zero crossings and a time period between zero crossings, to the rest of the volts-per-Hertz protective relay 59. Relay 59 operates a set of output relay contacts which are connected according to a typical application as shown in the lower half of FIG. 1.

It is to be understood that while a simple coil-and-contact electromechanical relay is termed a "relay" in the electrical art, the phrase "protective relay" (cf. ANSI Standard C37.90-1978) refers to an electrical device designed to respond to input conditions in a prescribed manner, and after specified conditions are met to cause contact operation or similar abrupt change in associated electrical circuits. Limit switches and similar simple devices are not protective relays in this sense. A relay may consist of several relay units or circuits, each responsive to a specified input with the combination of units providing the desired overall performance characteristic of the relay. "Pickup" occurs in a protective relay when a specific condition or conditions that the relay is designed to respond to are met. "Pickup" encompasses the activation, initiation or enablement of a protective relay timing or other function whether or not an alarm or trip output occurs.

Some of the output contacts in FIG. 1 of volts-per-Hertz relay 59 are next described. If the actual volts-per-Hertz exceeds a pickup value for alarm purposes for a definite period of time, normally open Alarm (ALM) contacts 71 of relay 59 close and actuate a visual or audible alarm device 73 connected in series therewith to "+" and "−" supply terminals through two fuses 75 and 77. If the actual volts-per-Hertz exceeds another larger pickup value that is set for timed trip purposes, then after a period of time that depends on the subsequent amounts and variation of the actual volts-per-Hertz, normally open Timed Trip contacts 81 of relay 59 close. When contacts 81 close, a circuit is completed to actuate a visual Trip Target device 83 which is a magnetically latched manually reset indicator. Also, contacts 81 are connected to parallel-connected trip coils 41TC and 52TC for the field circuit interrupter 41 and the circuit breaker 52 respectively. The trip coils 41TC and 52TC are respectively interlocked with series-connected auxiliary contacts 41a and 52a of interrupter 41 and circuit breaker 52 respectively. Contacts 41a are closed when the interrupter 41 contacts 43 are closed and open when contacts 43 are open. Contacts 52a are closed when main contacts internal to breaker 52 are closed and open when those main contacts are open.

If the actual volts-per-Hertz exceeds a third pickup value which is set higher than the other two pickup values for instantaneous trip purposes, then normally open Instantaneous Trip (INST TRIP) contacts 85 of relay 59 close. There is no intentional time delay built into relay 59 for this purpose. When contacts 85, close, a circuit is completed to actuate another visual Trip Target device 87 which indicates that instantaneous trip has occurred. Contacts 85 and Target 87 are connected in series with each other between fuse 75 and the trip coils 41TC and 52TC. In this way, when either a timed trip or an instantaneous trip occurs, the circuit breaker 52 is tripped to isolate the generator 11 and unit transformer 21 from bus 55; and field circuit interrupter 41 is tripped to disconnect the field winding 39 from exciter 37 and to lower the generator voltage as quickly as possible by means of discharge resistor 47 dissipating field current. As a result volts-per-Hertz relay 59 accomplishes its trip functions to remove a dangerously excessive or persistent volts-per-Hertz condition from an electric power system.

Relay 59 also includes self-monitoring functions and should these indicate that the relay 59 is malfunctioning, Relay Fail contacts 89 close to energize a Relay Fail warning device 91.

A power supply 93 for the circuitry of relay 59 is connected to fuses 75 and 77, and suitably has a conventional low burden, flyback switching design which delivers a nominal ±12 VDC.

Figure 2:
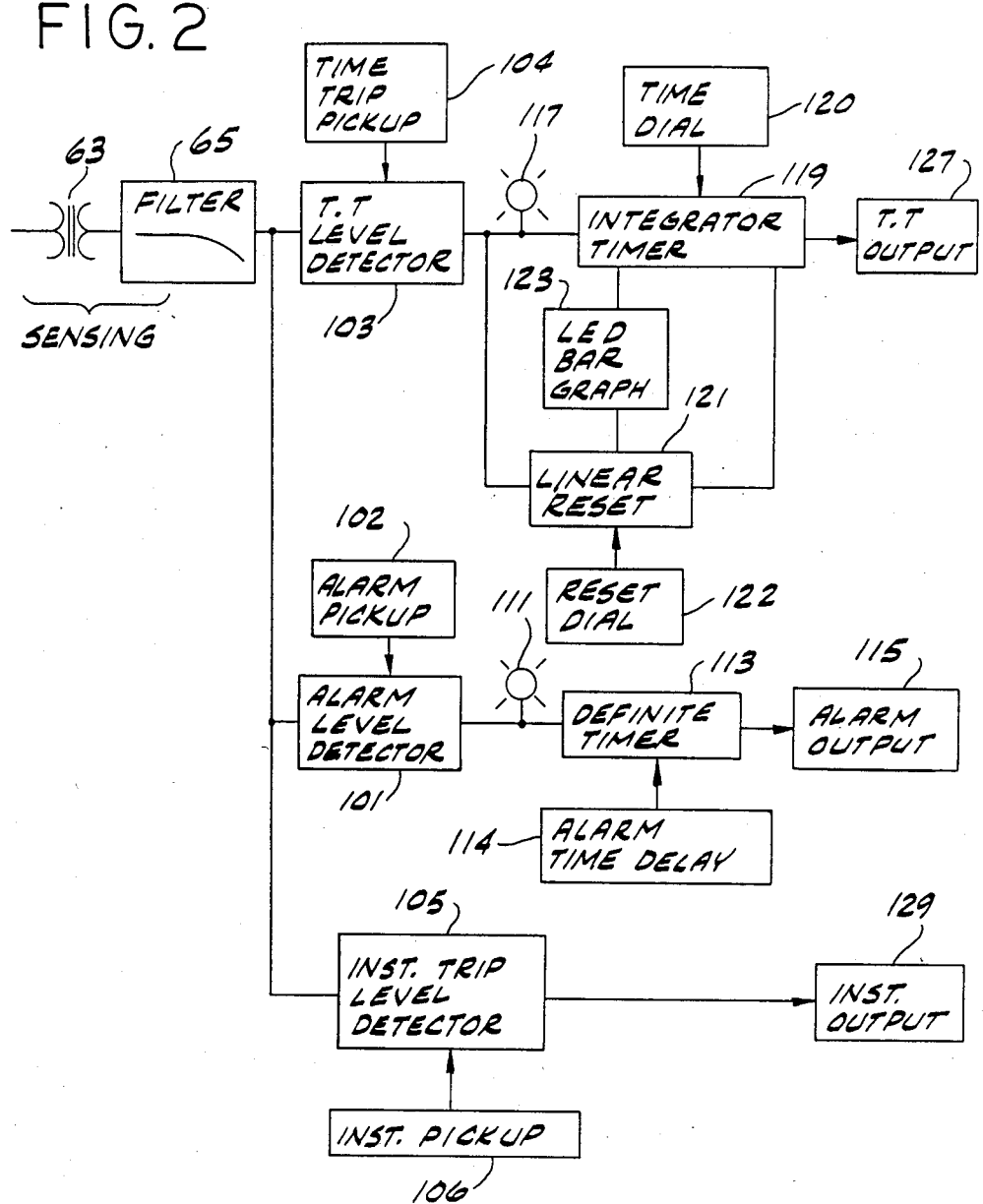
FIG. 2 is a functional block diagram of a volts-per-Hertz relay the invention which also represents various protective relaying methods of the invention having steps corresponding to the functions associated with the blocks.

FIG. 2 shows a functional block diagram and method diagram of volts-per-Hertz relay 59. Potential transformer 63 senses a single phase of system voltage. (An arrangement that senses all three phases and relays on the highest voltage can alternatively be provided.) This transformer 63 has a maximum saturating V/Hz of 5, for example, over a voltage range of 10 to 360 VAC and a frequency range of 2 to 72 Hz. in the preferred embodiment. The AC signal from the secondary of the input sensing transformer 63 is passed through a low-pass third harmonic (180 Hz.) filter. This filter substantially eliminates the peak distorting effect that third harmonic content in the AC signal places on a 60 Hz. fundamental waveform. Greater sensitivity and accuracy is achieved because the third harmonic filter attenuates third harmonic distortion. Potential transformer 63 feeds filter 65 which in turn supplies the AC output fundamental frequency to an Alarm Level Detector 101 with adjustable Alarm Pickup thumbwheels 102, Time Trip Level Detector 103 with adjustable Time Trip Pickup thumbwheels 104 and an Instantaneous Trip Level Detector 105 with adjustable Instantaneous Trip Pickup thumbwheels 106. Alarm Level Detector 101 turns on an Alarm LED 111 to indicate that an alarm pickup value is exceeded, and a definite timer 113 with adjustable Alarm Time Delay thumbwheels 114 is activated to determine whether the alarm pickup value is exceeded for at least a predetermined length of time. If so an Alarm Output relay 115 is actuated and contacts 71 of FIG. 1 close.

Time Trip Level detector 103 is set to a higher pickup level. If this higher level is exceeded, a time trip pickup LED 117 is turned on to indicate the occurrence. Then an integrator-timer 119 starting from an initial value electrically accumulates a numerical value toward possible trip. An adjustment parameter K for an inverse-square characteristic for this integrator timer is set by a Time Dial 120. A linear reset circuit 121 responds to the time trip level detector 103 when the volts-per-Hertz decreases below pickup and causes the numerical value from integrator-timer 119 to decrease in magnitude from its accumulated value to the initial value in a reset time interval which varies directly with the accumulated value if the value of actual volts-per-Hertz is less than the time-trip pickup level of volts-per-Hertz throughout the reset time interval. A reset slope parameter for reset purposes is set by Reset Dial 122. A LED bar graph circuit 123 is responsive to the integrator-timer 119 and to the linear reset circuit 121 to produce a display indicative of the magnitude of the numerical value as it increases and decreases in magnitude.

If and when the integrator-timer 119 accumulates a value which exceeds a predetermined maximum, a time trip signal is sent to actuate a Time Trip output relay 127 with contacts 81 of FIG. 1. This relay is deactuated and contacts 81 are opened when the linear reset circuit 121 decreases or reduces the accumulated value to its initial value.

Instantaneous Trip Level Detector 105 actuates Instantaneous Output Relay 129 and closes contacts 85 of FIG. 1 when the instantaneous trip pickup level on thumbwheels 106 is exceeded.

Figure 3:
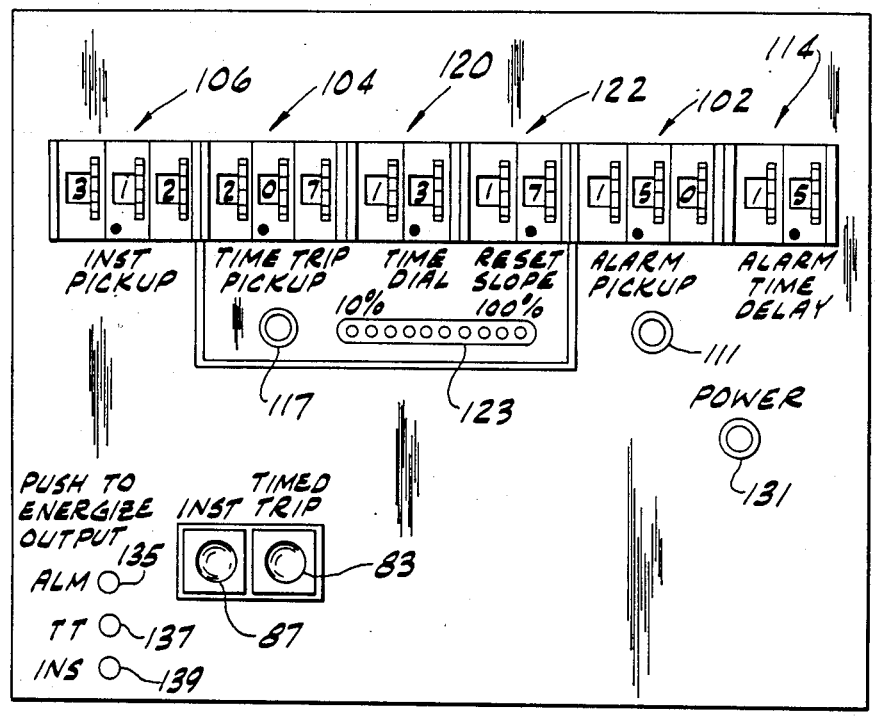
FIG. 3 is a pictorial diagram of controls and displays on a panel of a volts-per-Hertz relay of the invention.

In FIG. 3, front panel details of a preferred embodiment of volts-per-Hertz relay 59 are shown. Three Instantaneous Pickup thumbwheels 106 adjustably establish a pickup point for the instantaneous trip output. A suitable range of adjustment is from 1.00 to 3.99 V/Hz in 0.01 V/Hz increments. Three Time Trip Pickup thumbwheels 104 adjustably establish the pickup point for the time trip output. A suitable range of adjustment is also from 1.0 to 3.99 V/Hz in 0.01 V/Hz increments. Two Time Dial thumbwheels 120 adjustably select a particular inverse square characteristic curve for the relay. Adjustment is from 0.1 to 10 in increments of 0.1. A setting of 00 is equivalent to a setting of 10.

Two Reset Slope thumbwheels 122 adjustably establish a linear rate of reset per percent of full-scale accumulated value, or equivalently in per unit of accumulated value, in integrator-timer 119 to model the cooling rate of protected equipment. Adjustment is from 0.1 to 9.9 seconds per percent of accumulated value in 0.1 second increments. In other words, if the relay 59 integrator-timer 119 accumulates sufficiently (100%) to do a time trip, then the relay will reset in one hundred (100) times the number of seconds indicated by thumbwheels 122 and deactuate the output relay at that time. However, if the integrator-timer 119 accumulated 50% of the amount needed to trip and then the overexcitation ceases, then the accumulated value will become fully reset in 50% of 100 times the time shown on thumbwheels 122. LED bar graph 123 shows the accumulated value in the integrator-timer 119 at any given time. A setting of 00 on thumbwheels 122 enables the reset time to be instantaneous.

Three Alarm Pickup thumbwheels 102 adjustably establish the pickup point for the alarm output and are adjustable from 1.00 to 3.99 V/Hz in 0.01 V/Hz increments. Two Alarm Time Delay thumbwheels 114 establish the definite time delay for alarm output and are adjustable from 0.1 to 9.9 seconds in 0.1 second increments. A setting of 00 signifies an instantaneous alarm output.

Also, on the front panel of FIG. 3, a red light-emitting diode (LED) Alarm Pickup indicator 111 is illuminated to indicate that the alarm pickup setting has been exceeded and that the Volts-per-Hertz relay 59 is timing for alarm purposes. Another red LED 117 acts as a Time Trip Pickup indicator which illuminates to indicate that the time trip pickup setting has been exceeded and that the relay 59 is timing for time trip purposes. A red LED Power indicator 131 lights when the power supply is providing nominal ±12 VDC to the internal circuitry of relay 59.

Magnetically latching, manually rest Trip Target indicators 87 and 83 provide visual indication that the respective Instantaneous or Timed Trip trip output relay has been energized. Each Trip Target indicator is manually reset by a target reset lever (not shown). Each of the output contacts of the Volts-per-Hertz relay can be manually actuated by insertion of a ⅛ inch diameter nonconducting rod as a Push-to-Energize element through respective access holes 135, 137 and 139 in the front panel.

In a Time Status Display (TSD) a series of ten LEDs of bar graph circuit 123 are used to indicate accumulation of numerical value towards trip (100%) or decrease thereof toward reset (0%). Each LED represents 10% of a total accumulation of 100%. A first left set of three LEDs in the TSD are green, a second middle set of four LEDs are yellow and a third right hand set of three LEDs are red.

When a preselected level VHS on the Timed Trip Pickup thumbwheels 104 is exceeded, the LEDs of the TSD bargraph circuit 123 are turned on in ascending order from left to right (green G to yellow Y to red R) as percentage value toward trip is accumulated. When all LEDs are illuminated, the Time Trip Output relay is energized, closing its contacts 81. When the preselected level on the Timed Trip Pickup thumbwheels 104 is no longer exceeded after trip, the LEDs of the TSD are turned off in descending order from right to left (red to green) as a decrease in percentage value toward reset occurs. When all LEDs in bargraph 123 are extinguished, the Time Trip Output relay 127 of FIG. 2 is deenergized, opening its contacts 81.

Figure 4:
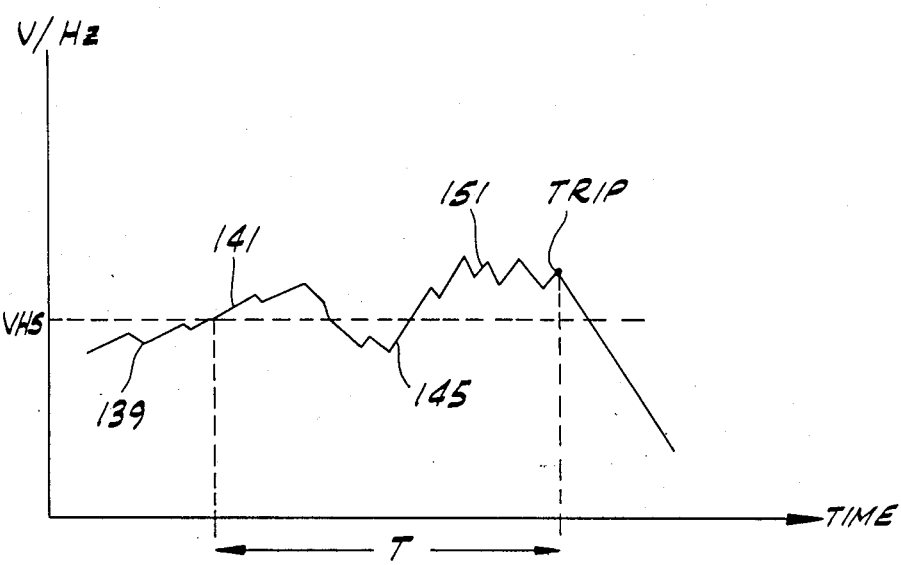
FIG. 4 is a diagram of a varying actual volts-per-Hertz versus time in an electrical power system.
Figure 5:
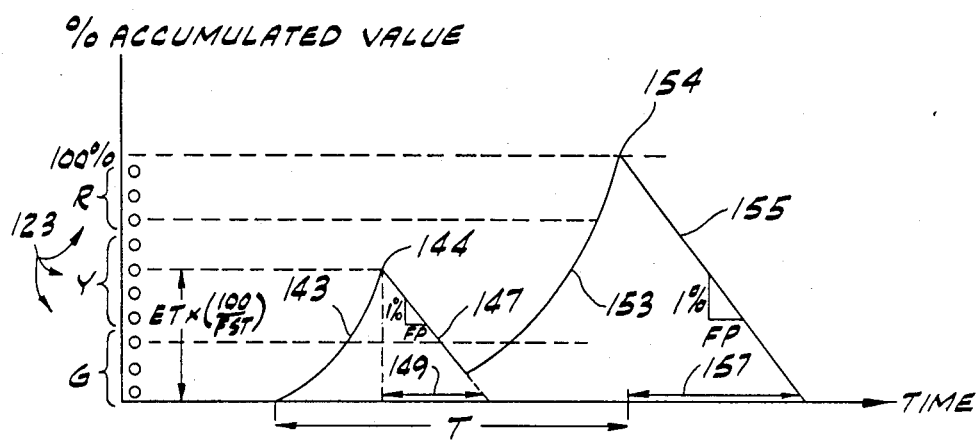
FIG. 5 is a diagram of an electrical signal versus time produced in a volts-per-Hertz relay of the invention, increasing and decreasing and then increasing again until a 100% value is reached whence a trip signal is provided by the volts-per-Hertz relay of the invention, a set of ten display light emitting diodes (LEDS) from the panel of FIG. 3 being aligned with the vertical axis for illustration.

In another hypothetical sequence of events shown in FIGS. 4 and 5, the Time Trip Pickup value VHS (dashed line of FIG. 4) is at first greater than the actual volts-per-Hertz 139 in the power system and then is itself exceeded by the actual volts-per-Hertz 141 for a time. Percentage value 143 toward trip accumulates in FIG. 5 during the time of excessive volts-per-Hertz 141, and the LEDs of bargraph 123 are turned on in ascending order of accumulated value ET until some of them but not all are on at point 144. Then, without any trip having occurred, the actual Volts-per-Hertz 145 sensed falls below the pickup value VHS. The Time Trip Output relay 127 does not close because 100% value has not been reached. The LEDs of the TSD are turned off in descending order from right to left (yellow to green) as resetting proceeds and the percentage value 147 falls with a slope parameter FP (in seconds per percent) determined by the front panel setting on thumbwheels 122. The Time Status Display thus shows in an impressively visual way the operations of the Time Trip function of the Volts-per-Hertz relay regardless of whether the relay actually trips.

If the actual volts-per-Hertz VH remained below pickup VHS a reset time 149 in FIG. 5 would elapse whence 0% value would be reached. Before reset time 149 elapses, however, the actual volts-per-Hertz 151 exceeds pickup value VHS again. Percentage value 153 accumulates, this time all the way to 100% at a point 154 whence the relay 59 trips its Time Trip Output relay 127 of FIG. 2 and closes contacts 81 of FIG. 1. Interrupter 41 and breaker 52 of FIG. 1 are both tripped, removing the excessive volts-per-Hertz condition in FIG. 4. Relay 59 begins the linear reset process again, and reduces the percentage accumulated value 155 in FIG. 5 with the same slope parameter FP as the slope parameter of the earlier decreasing percentage value 147. (Parameter FP in seconds per percent is the reciprocal of the slope in percentage per second.) A reset time period 157 is consumed in returning the accumulated value of 100% to its initial value of 0%. Clearly, the reset time period 157 is longer than the relatively short reset time period 149 which would have been used to reset from the lower accumulated value at point 144. Advantageously, the relay 59 adapts its actual time of reset to the different projected temperatures of the protected equipment resulting from the history of actual volts-per-Hertz in the electric power system. Also, the relay 59 adapts its actual time T to trip to the relatively accurate simulation of heating and cooling in the protected equipment which corresponds to the percentage accumulated value resulting from the history of actual volts-per-Hertz so that unnecessary tripping is prevented, but necessary tripping occurs as soon as it is needed.

The Volts-per-Hertz overexcitation relay 59 advantageously is used to protect generators, transformers, and iron core reactors from adverse effects of excessive heating as a result of overexcitation. The relay advantageously models the heating and cooling characteristics of the protected equipment. By accumlating value towards tripping whenever the timed trip volts/hertz pickup setting VHS is exceeded, the relay simulates heat buildup within the protected equipment. Once heated, of course, the metal in the equipment does not cool instantaneously. To model the cooling over time, the volts-per-Hertz relay has a linear reset characteristic which can be adjusted to closely correspond to the cooling rate of the protected equipment. In this way, as heat builds up and dissipates within the protected equipment due to overexcitation excursions, it is closely protected by the relay tripping and reset characteristic.

An inverse square timed trip characteristic stored in relay 59 allows relay 59 to be closely coordinated with a "damage curve" for the protected equipment. This close coordination allows optimum utilization of the protected equipment by avoiding unnecessary trips and corresponding loss of utilization of the protected generating equipment for example. The definite time alarm feature allows even more effective use of equipment by alerting an operator of potentially dangerous conditions. Once alerted, the operator can take corrective action to prevent the necessity of a relay trip. Alternatively, the definite-time alarm output contact is used to initiate automatic corrective action. The instantaneous trip feature provides high-speed tripping for the most severe conditions.

To implement the inverse square timing and reset for the Time Trip feature, an Integrating Trip Timer function within a microprocessor circuit of relay 59 is initiated when preselected pickup value VHS has been exceeded. The timer begins timing (ramping up) in accordance with a preestablished inverse square curve until a trip output is produced. A total time delay TDL required for time trip at constant ratio M is given by the formula $$TDL = (\text{Time Dial Setting})/(M-1)^2 \quad (1)$$

where $$M = VH/VHS \quad (2)$$

and VH is the Actual V/Hz and VHS is the V/Hz Pickup Setting on thumbwheels 104.

In actuality, the ratio M varies with time. Accordingly, an incremental value TIMVAL is calculated at equal intervals DT for equally spaced times N=1, 2, 3, where $$TIMVAL = FST \times DT/TDL(N) \quad (3)$$

and FST is a 100% level of accumulated values that would be needed for a time trip to occur. The incremental values are accumulated as a total in a register TTTIMER by summing them according to the following recursive equation as long as ratio M exceeds unity:

$$TTTIMER = TTTIMER + TIMVAL \quad (4)$$

When the total TTTIMER reaches a predetermined value of 100% (FST), a time trip signal is produced. In this way when the ratio M exceeds a preestablished amount (e.g., unity) a digital electrical signal corresponding to TTTIMER is increased in magnitude by an amount which is a direct function of the excess of the ratio over the predetermined value. This is because $(M-1)^2$ is in the denominator of equation (1) and therefore TIMVAL from equation (3) equals $(M-1)^2 \times DT/(\text{Time Dial Setting})$. TIMVAL is greater as M increases so that there is a direct function relationship and not an inverse relationship.

Actual volts-per-Hertz VH is proportional to the product of the measured peak voltage V and the half-period of each cycle 1/(2F), where F is actual frequency. Volts-per-Hertz pickup value VHS is proportional to the product of an electrical level PU for pickup comparison purposes multiplied by the same half-period of each cycle. Consequently, the ratio M of equation (2) that should be measured for use in equations (1), (3) and (4) is also given by $$M = V/PU \quad (5)$$

Using the relationship of equation (5), it is further advantageously recognized herein that the ratio M can be measured by measuring time periods associated with the AC output waveform from filter 65. Measuring of time periods is readily accomplished by the microprocessor and inexpensive associated hardware. For this purpose, three time periods are defined as follows:

A. $t_1$—half-period time interval of AC output filter waveform

B. $t_3$—period of time in a half-cycle of the waveform during which the waveform exceeds the electrical level PU (calculatedfrom pickup V/Hz VHS on dial 104 and from $t_1$)

Figure 6:
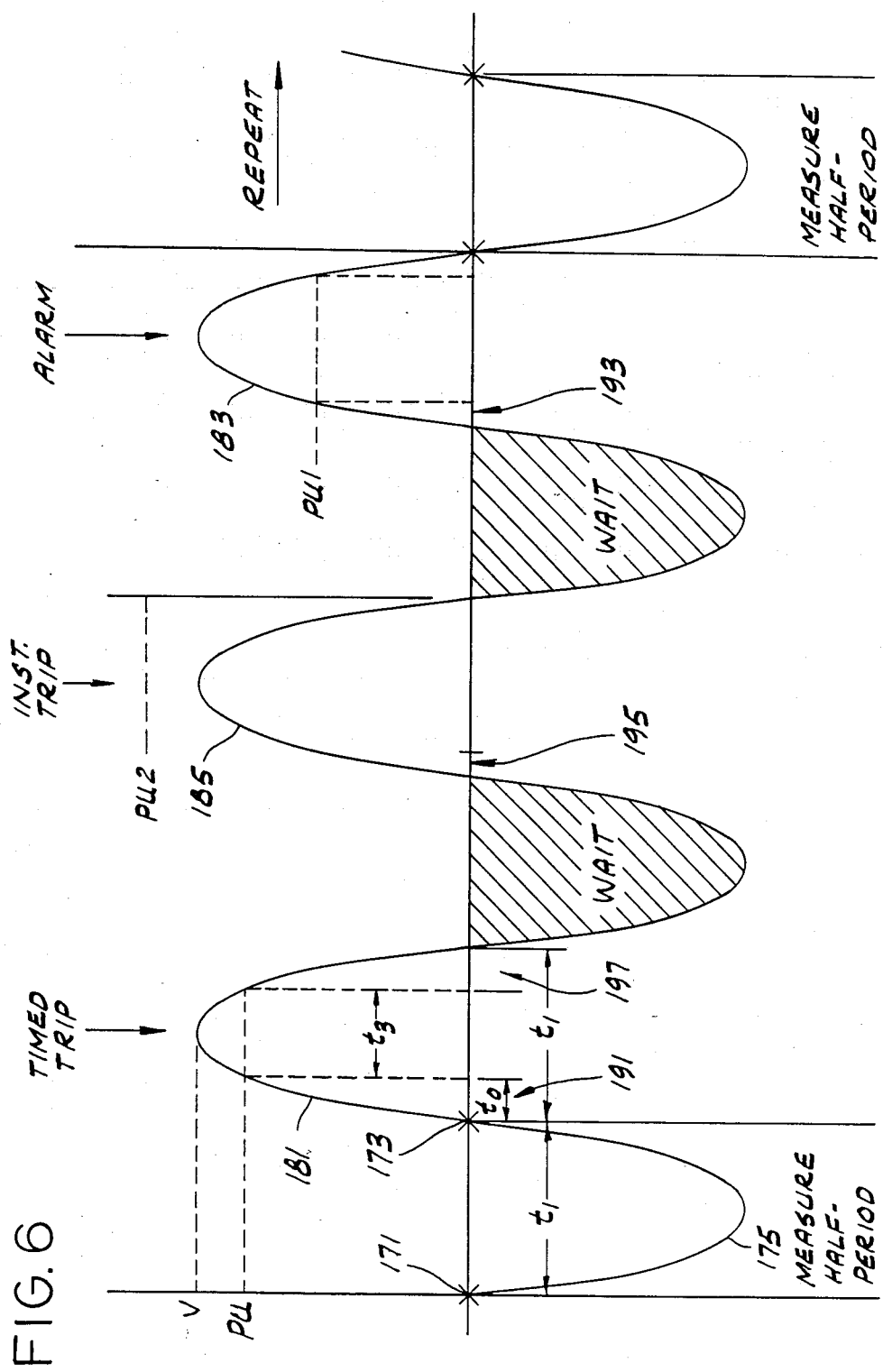
FIG. 6 is a waveform diagram of operations of a volts-per-Hertz relay of the invention in various half-cycles of an AC output waveform.

C. $t_0$—time from zero crossing to instant when waveform first exceeds electrical level PU. $t_0 = (t_1 - t_3)/2$ Inspection of FIG. 6 shows that the ratio M=V/PU is related to these readily measurable time periods by a number of trigonometric equations, some of which are listed below and are equivalent:

$$M = 1/\sin((pi)t_0/t_1) \quad (6)$$

$$M = 1/\cos((pi/2) t_3 - t_1) \quad (7)$$

$$M = 1/\sin((pi/2)(1 - t_3/t_1)) \quad (8)$$

$$M = 2 \times \frac{(t_0/t_1)}{\sin((pi)t_0/t_1)} \times t_1/(t_1 - t_3) \qquad (9)$$

where "pi" is the ratio of the circumferences of a circle to its diameter (3.14159 ... ).

In the software for a preferred embodiment a lookup table, for example, is prepared for the appropriate trigonometric function. For example, in software for a preferred embodiment that computes equation (9), a lookup table called TBL is prepared for the trigonometric ratio function involving $t_0/t_1$ therein. $t_1$ is designated LOGFQ and $(t_1-t_3)$ is called MAGCAL for the present purposes. Equation (9) for that embodiment is therefore expressed as $$M = 2 \times TBL \times LOGFQ/MAGCAL \qquad (10)$$

Compared with approaches that integrate the input waveform with unavoidable ripple and excessive time delays, the preferred embodiment measures a time interval $t_1$ between zero crossings of the AC output filter waveform fundamental and generates a corresponding frequency-dependent reference voltage or electrical level PU, PU1 and PU2 depending on the V/Hz pickup settings and the time period or interval $t_1$. Then time period $t_3$ during which the AC output waveform exceeds the electrical level, if at all, is measured. From the measurements, ratio M is readily calculated by any of the equations (2 and 5-10) and then used to compute the accumulated percentage value according to equations (1), (3) and (4).

The pickup levels just mentioned are initially computed as follows:

$$PU\ VHS \times VS \times 10/(1000 \times LOGFQ) \qquad (11)$$

$$PU1 = VHS1 \times VSF \times 10/(1000 \times LOGFQ) \qquad (12)$$

$$PU2 = VHS2 \times VSF \times 10/(1000 \times LOGFQ) \qquad (13)$$

In words, each pickup electrical level PU, PU1 or PU2 is computed from its respective Volts-per-Hertz setting VHS, VHS1 or VHS2 on thumbwheels 104, 102 or 106. The setting is multiplied by a voltage scaling factor VSF, and by a front-panel thumbwheel multiplication constant of 10, and then divided by the time period LOGFQ (equals $t_1$) in milliseconds. Scaling factor VSF makes the result compatible with the range of a digital-to-analog converter (DAC) used with the microprocessor 201 and is predetermined from an incoming test frequency and front panel setting and a voltage division ratio inherent to the hardware of relay 59.

The microprocessor and associated hardware (discussed hereinbelow in connection with FIG. 7) advantageously performs all detection, timing and computation operations for the Integrator-Timer and other blocks of FIG. 2. The microprocessor synchronizes its operation to the input waveform and independently monitors each front panel thumbwheel setting.

With reference to FIG. 6, sensing in one microprocessor-based preferred embodiment is advantageously performed on a three-cycle basis. First, a half-period time interval $t_1$ between zero crossings 171 and 173 of a first negative half-cycle 175 of the AC output filter 65 waveform is measured. On the very next positive half-cycle 181, an electrical level PU for timed trip is calculated. On the next two consecutive positive half-cycles 185 and 183, an instantaneous trip electrical level PU2 and an alarm electrical level PU1 are calculated respectively and as a function of the corresponding V/Hz front-panel settings for Instantaneous Pickup 106 and Alarm Pickup 102. The microprocessor is programmed to compute the electrical levels PU, PU1 and PU2 starting with each positive-going zero crossing in short time intervals 191, 193 and 195 respectively or during the preceding intervals while the waveform is negative and the microcomputer is in effect waiting for the positive half cycles to occur. Because the microprocessor makes the computations in a very short period compared to the width of a half cycle of the AC output voltage sinusoid, the computations of the electrical levels are completed well before the AC output voltage reaches any pickup value.

In the case of time trip monitoring in half cycle 181, the microprocessor determines whether the pickup electrical level PU was exceeded. If so, then after the AC output voltage falls below PU again and during a time interval 197 before the next zero crossing, the microprocessor calculates the ratio value M, and computes the incremental value TIMVAL.

A further mathematical discussion of a reset aspect of some preferred embodiments is provided next.

If the waveform peak value V in the half-cycle 181 of FIG. 6 becomes less than the electrical level PU, the microprocessor decreases the Integrator-Timer accumulated value at a linear rate (ramping down) that is based on that accumulated value and a reset rate parameter value from the front panel reset thumbwheels 122.

A total delay TDR for reset in seconds is expressed by the formula $$TDR = (ET/FST) \times FP \times 100 \qquad (14)$$

where ET is accumulated value toward trip before resetting begins, FP is the setting on the front panel Reset Thumbwheels 122 and FST is a 100% level of accumulated value that would be needed for a time trip to occur. ET/FST is same ratio as the fraction of the LEDs in bargraph 123 which are lighted when resetting begins. A digital signal produced by thumbwheels 122 to represent setting FP is regarded as an example of a reset control signal representative of a reset rate parameter for the relay.

The resetting occurs on an incremental basis so that incremental value TIMVAL during reset is calculated as $$TIMVAL = RSTSCL/FP \qquad (15)$$

where RSTSCL is a reset scaling factor equal to one hundredth of the full scale trip value FST times the time base DT (e.g., DT=10 msec.)

Substituting the definition of RSTSCL as well as equation (14) into equation (15) yields a further expression $$TIMVAL = ET \times DT/TDR \qquad (16)$$

As resetting proceeds the accumulated time TTTIMER is decremented by each value of TIMVAL so that $$TTTIMER = TTTIMER - TIMVAL \qquad (17)$$

In the present work the same quantity TTTIMER acts as a time trip "timer" when it is incremented by TIMVAL according to equation (4). TTTIMER also acts as a reset "timer" when it is decremented by TIMVAL by equation (17). It is emphasized that TTTIMER is a register of accumulated value according to the equations above and is not an actual timer of clock time.

In this way, the volts-per-Hertz relay 59 more precisely simulates the actual heating and cooling characteristics of protected apparatus when the time dial and reset dial thumbwheels are properly set. Twin objectives are (A) to prevent an unduly rapid reset which would produce an erroneous indication of complete reset to an initial value of TTTIMER when the protected machine is still hotter than a base temperature, and (B) to reset rapidly enough so that a subsequent excessive but temporary volts-per-Hertz condition does not cause an unnecessary trip and consequent economic loss.

Even though any particular unit of protected apparatus has a fixed thermal time constant, the actual time required for it to cool from a given temperature rise condition to an appropriate base temperature rise above ambient still varies directly with the temperature rise. ("Varies directly" means that one variable increases when a second variable does, whether or not their relationship is linear. For example, the cooling time is greater if the temperature rise due to overexcitation of the protected equipment is greater.) Advantageously, the preferred embodiment provides a reset arrangement which provides a panel setting for a slope parameter in seconds per percentage of accumulated value, thereby making the time for reset longer for higher levels of accumulated value in TTTIMER. In this way the time interval TDR for reset varies directly with the accumulated value; and the reset slope, or rate parameter, is independent of the accumulated value. As a result, the panel setting as a slope parameter more truly models the cooling curve of a protected apparatus resulting in shorter actual reset times for most cases than some fixed reset time that would have to be set long for the worst case.

In mathematical terms, the cooling characteristic of the protected apparatus is given by the equation $$TA + TB = TA + TRe^{-t/C} \qquad (18)$$

where TA is ambient temperature, TB is base temperature rise above ambient to which the apparatus must cool for reset to be valid, and TR is the temperature rise that occurs upon a given volts-per-Hertz condition persisting for a given time. C is the thermal time constant of the protected apparatus and t is the time required for reset.

Solving equation (18) for reset time TDR=t yields $$TDR = C \ln(TR/TB) \qquad (19)$$

Temperature rise TR is directly related and approximately proportional to the accumulated value of the integrator-timer in relay 59 when the Time Dial setting is correctly made after temperature measurements on the protected equipment. A front panel setting is set for an appropriate parameter of the reset time relationship. Since equation (19) can be linearized, the parameter selected is a straight-line slope reciprocal such as seconds per percentage (front panel setting FP) in the preferred embodiment. FP is set equal to or greater than the time experimentally determined for the machine to cool from a maximum tolerable temperature rise TR1 under overexcitation conditions to base temperature TB such as 5 degrees above normal operating temperature rise.

It is to be understood that in alternative embodiments of the invention, other parameters can be input by front panel thumbwheels. For example, an experimentally determined cool down time can be entered on one set of thumbwheels with a ratio of the maximum tolerable temperature rise TR1 and base temperature TB on another set of thumbwheels to describe the unit of protected apparatus. Equation (19) is solved with TR set equal to TR1 to obtain thermal time constant C in an initialization routine on power up. Constant C so computed electronically constitutes another example of a reset control signal representative of a reset rate parameter for the relay. Then the relay produces a nonlinear time to reset TDR value according to the equation (19) using the computed constant C and value of estimated temperature rise TR found from $$TR = TB + (TR1 - TB) \times ET/FST \qquad (20)$$

or from whatever formula is found to most precisely relate the accumulated value ET to temperature rise TR. The incremental value TIMVAL (equation (16)) is computed on the basis of the computed value of TDR, and TTTIMER is decremented according to equation (17).

In still other embodiments, equation (18) is recognized to be a solution of a difference equation $$\frac{ET(N+1) - ET(N)}{DT} = -ET/C \qquad (21)$$

which is then solved and corresponds to the following recursive equation for programming purposes $$TTTIMER = TTTIMER - TIMVAL \qquad (22)$$

where $$TIMVAL = \frac{DT \times TTTIMER}{C} \qquad (23)$$

In this way the value in TTTIMER decays exponentially and thereby accurately simulates the cooling of protected equipment. Since a decaying exponential approaches zero only asymptomatically, this embodiment is programmed to deactuate the time trip output upon reaching a value such as 10% of FST.

Figure 7:
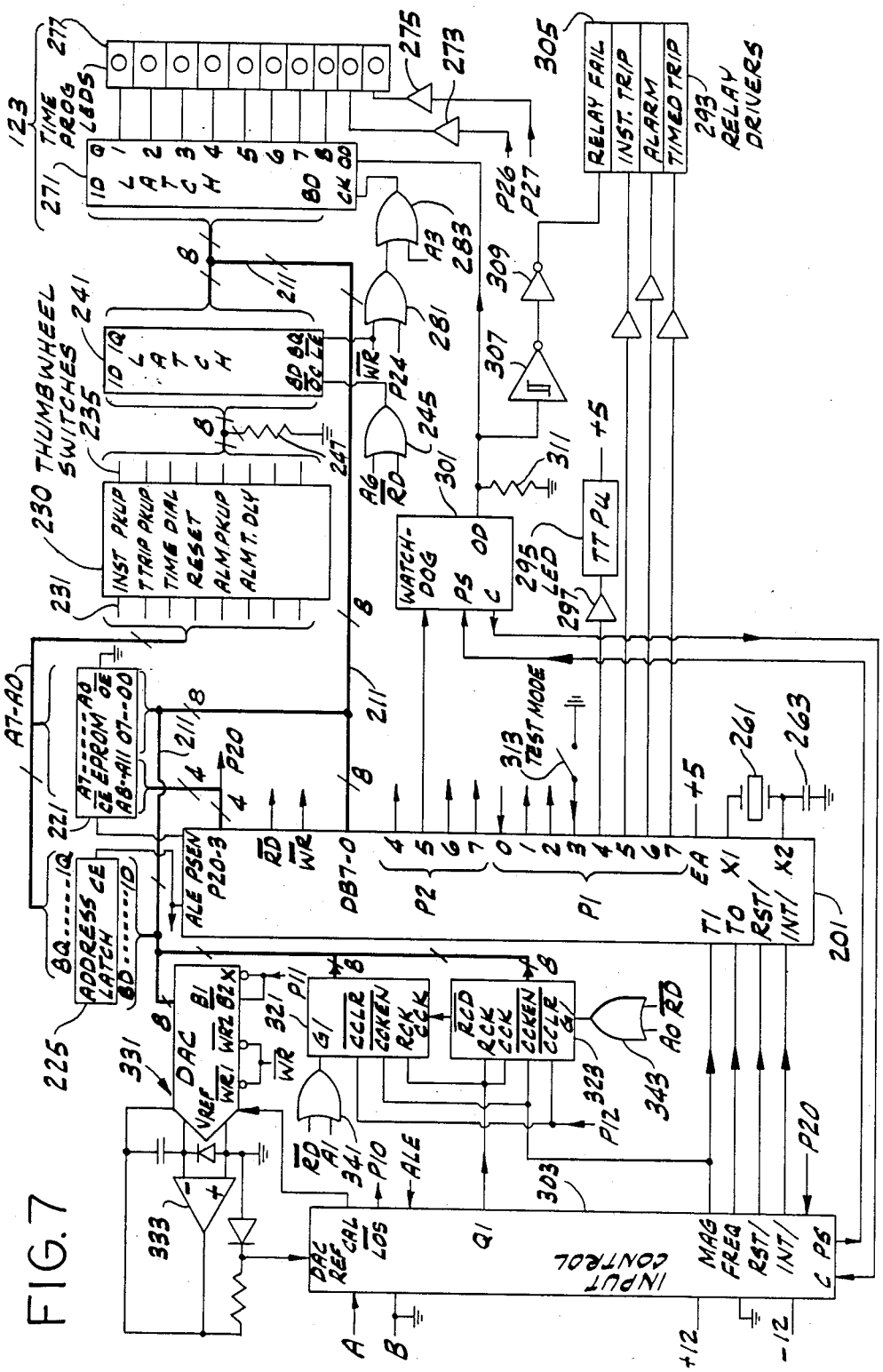
FIG. 7 is a block diagram of a microprocessor-based circuit of a volts-per-Hertz relay of the invention.

In FIG. 7 relay 59 uses an 80C39 microcomputer 201 that has a data bus 211 and operates in accordance with a main program and a timing interrupt routine which are stored in an EPROM (erasable programmable read only memory) 221. The 80C39 microcomputer 201 is one of a family of MCS-48 (TM) computers from Intel Corporation, Santa Clara, California. See *MCS-48 (TM) Family of Single Chip Microcomputers User's Manual,* 1980, Intel Corp., Chapter 1 and first 7 pages of Chapter 4. Microcomputer 201 addresses EPROM 221 at a set of address pins A0-A11 by supplying the lower 8 bits of the address from a set of pins DB7-0 to an address latch 225 while enabling it from pin ALE (Address Latch Enable). The lower 8 bits of the address are then asserted to EPROM 221 by the Q outputs 8Q-1Q of latch 225 and the upper 4 bits of the address are asserted by microcomputer 201 from port P2 pins 0-3. A chip enable CE/input of EPROM 221 is actuated by a signal from pin PSEN and an 8-bit output from pins O7-O0 of EPROM 221 is fed back to pins DB 7-0 of microcomputer 221, thereby reading EPROM 221.

Front panel thumbwheel switches 230 allow the user to program the V/Hz relay 59 or various pickup settings, time settings and a reset rate parameter as discussed in connection with FIG. 3. Each thumbwheel selects an array of diodes leading to four output lines which when energized produce binary coded decimal (BCD) nibbles depending on thumbwheel setting which are read by the microcomputer 201. To energize the thumbwheel switches 230, microcomputer 201 latches a byte into address latch 225. The byte has 8 bits, one of which is a "1" and the rest are "0". Thumbwheel switches 230 have 8 input lines 231 and 8 output lines 235 to an 8 bit latch 241. A single one of the 8 input lines is energized to address two of the thumbwheels at a time. Two BCD nibbles (4 bits apiece) are respectively output from each of the two addressed thumbwheels, so that all 8 of the output lines 235 communicated BCD thumbwheel inputs to inputs 1D-8D of latch 241. In this way, the various thumbwheels constitute an example of adjustable means for supplying respective electrical signals representing values of volts-per-Hertz, times, and rates to the means for generating (e.g., microcomputer 201 and input control 303).

Microcomputer 201 collects the thumbwheel information by addressing input lines 1-8 of thumbwheel switches 230 with respective single high bits and latching the switch 230 output on lines 235 into latch 241 with a command WR/ to latch enable pin LE/. Outputs 1Q-8Q are tristate outputs that float electrically until a chip-enable OR-gate 245 supplies an output control signal to pin OC/ to output the latch 241 contents onto a data bus 211. OR-gate 245 responds to address bit A6 low and read output RD/ low. Microcomputer 201 is programmed in a conventional manner to segregate and interpret the thumbwheel information as two digit or three digit numbers as indicated in FIG. 3.

In FIG. 7 all pins from PSEN down to P1-7 of microcomputer 201 drawn on the right vertical side of the block therefor, as well as the pins T1, T0, RST and INT/ on the left side, are provided with pullup resistors to +5 volts. These resistors are omitted from the drawing for clarity. Bus notation is employed for further clarity, wherein a slash through a line indicates multiple electrical conductors equal in number to a number indicated nearby. Slashes on either side of resistor 247 indicate that this component is replicated for each conductor in a bus. Conductors WR/, RD/, ALE, P10-P12, P20, P24, P26, P27, A0, A1, A3 and A6 are broken in the drawing for clarity, although complete connections are represented thereby. Chip pins that are unused, held inactive or represent power leads VCC and VSS are omitted for clarity, in accordance with conventional drawing practice in the art. Microcomputer 201 has a 6 MHz. clock crystal 261 connected between input pins X1 and X2 and a capacitor 263 connected from pin X2 to common.

Microcomputer 201 provides signals on bus 211 to an 8-bit latch 271 which, together with two buffers 273 and 275 from pins P26 and P27 respectively, actuate a set of ten LEDs 277 for a Time Status display corresponding to bargraph 123 of FIG. 2. Latch 271 and LEDs 277 are an example of a means for producing a display indicative of the magnitude of a digital signal repesenting the TTTIMER accumulated value as it increases and decreases in magnitude. Latch 271 is clocked by chip enable OR-gates 281 and 283 when Write WR/ and output P24 and address bit A3 simultaneously are low. Microcomputer 201 also provides signals from pins P15-P17 to three buffers that actuate three relay drivers 293 for output contacts of Instantaneous Trip, Alarm and Timed Trip. Also, an LED 295 is actuated through a buffer 297 from the microcomputer 201 pin P14.

Operation of the microcomputer 201 is continuously monitored by a program monitor circuit labelled Watchdog 301. An input control circuit 303 has microprocessor resetting circuitry which cooperates with Watchdog 301 in response to output P25 to provide a latched automatic computer reset RST/ in event of malfunction. ("Reset" in this sense holds the microcomputer 201 operations at an initial location in software until the reset is lifted, and is not referring to the process of decreasing the magnitude of the digital signal corresponding to an accumulated value in the integrator-timer for volts-per-Hertz relaying purposes.) Circuit 303 also includes a circuit for generating an interrupt signal INT/ when a loss of power to reclosing relay 59 is anticipated. Loss of power is determined to be imminent when a DC power supply output ±12 falls below a predetermined level.

In normal operation the microcomputer 201 randomly outputs pulses at intervals that have a reasonably predictable arithmetic mean. If these pulses are disrupted, the program monitor watchdog circuit 301 discontinues microcomputer 201 operation, and provides an Output Disable (OD) high which actuates Relay Fail output 305 through an inverter 307 with hysteresis followed by an inverter 309 to Relay Fail output 305. The Output Disable high also extinguishes the Time Status LEDs 277 by forcing latch 271 to high impedance. A pull-down resistor 311 is provided for the output of Watchdog 301. If the Output Disable is the result of something other than hardware failure, it is suitably remedied by manually interrupting operating power and turning it back on. A Test Mode switch 313 connected to microcomputer 201 pin P13 is used to temporarily cause microcomputer 201 to turn on all LEDs in sequence thrreby verifying their operation, and proper microprocessor operation.

Input control 303 includes the filter 65 which is fed by potential transformer 63 on input lines A and B of FIG. 7. Two testable inputs T0 and T1 of microcomputer 201 are respectively connected to input control circuit 303. Testable input T0 changes state at each zero crossing of the AC output filter waveform of FIG. 6, and T0 is low when the AC output is negative or zero, and otherwise is high. Testable input T1 is low either when the AC output is negative or when it is greater than an electrical level PU, PU1 or PU2 to which the AC output is compared.

A 16 bit counter-and-latch is formed by connecting two 74HC540 counter-and-latch chips 321 and 323 together. These counters are connected to a first comparing means in input control 303 for measuring the time period between zero crossings, which comparing means is OR-ed with a second comparing means for measuring the time period during which any of the electrical levels PU, PU1 or PU2 is exceeded. Microcomputer 201 is connected to the thumbwheel switches 230 through latch 241 and is also fed by the first comparing means and programmed to produce a digital signal on bus 211 representing the electrical level PU, PU1 or PU2 which is a function of both the time period and the pickup value settings on the thumbwheels. This digital signal is communicated to a digital-to-analog converter (DAC) 331 with a current-to-voltage output operational amplifier 333 and its associated components. DAC 331 and amplifier 333 convert the digital signal to an analog voltage signal DACREF which also represents the electrical level. The analog signal DACREF is connected to the input control 303 and to the second comparing means therein which also is connected to the AC output filter waveform to detect when the AC output exceeds the analog signal DACREF in magnitude. Microcomputer 201 is also fed by the second comparing means and programmed to produce an output signal (e.g. P14-P16 for Time Trip Pickup, Instantaneous Trip or Alarm depending on the half-cycle of the waveform tested) when an excess is detected by the second comparing means. Since the second comparing means is OR-ed with the first comparing means, the counters 321 and 323 measure the length of time in each half cycle during which the excess is present. Microcomputer 201 also uses this further counter information to compute a measured value of the ratio M for time trip purposes.

DAC 331 is a 12-bit National Semiconductor device (type no. DAC1232) that is controlled by the high and low logic levels on pin P11 from microcomputer 201 at DAC pins X and B1/B2. The WR/line is provided to corresponding low active WR1/ and WR2/ pins of DAC 331. Microcomputer 201 sequentially controls the 12-bit DAC 331 to load all 12 bits from the 8 bit bus 211. A reference voltage for conversion purposes $V_{REF}$ nis provided from input control 303 on a CAL calibration line that supplies an adjustable current from a regulated −9 volt source.

In counters 321 and 323 the pin mnemonics are as follows: CCK counter clock input, CCLR/low-active counter clear input connected to pin P12 for clearing under software control from microcomputer 201, CCKEN/low-active counter enable input connected to circuit 303 MAG output and pin T1, G/low-active pin to make tristate counter output active, RCD/low active carry from counter 323 to CCK input of counter 321, and RCK register clock with internal tristate latch on output connected to an output Q1 from circuit 303. The CCK input of counter 323 is connected to the output Q1 also.

8-bit wide outputs of both counters 321 and 323 are connected in parallel to the 8-bit data bus 211 and the counters are read out separately. Two OR-gates 341 and 343 respectively enable the G/pins of counters 321 and 323. OR-gate 341 produces an active low when the RD/line and address line A1 are low. OR-gate 343 produces an active low when the RD/line and address line A0 are low.

Figure 8:
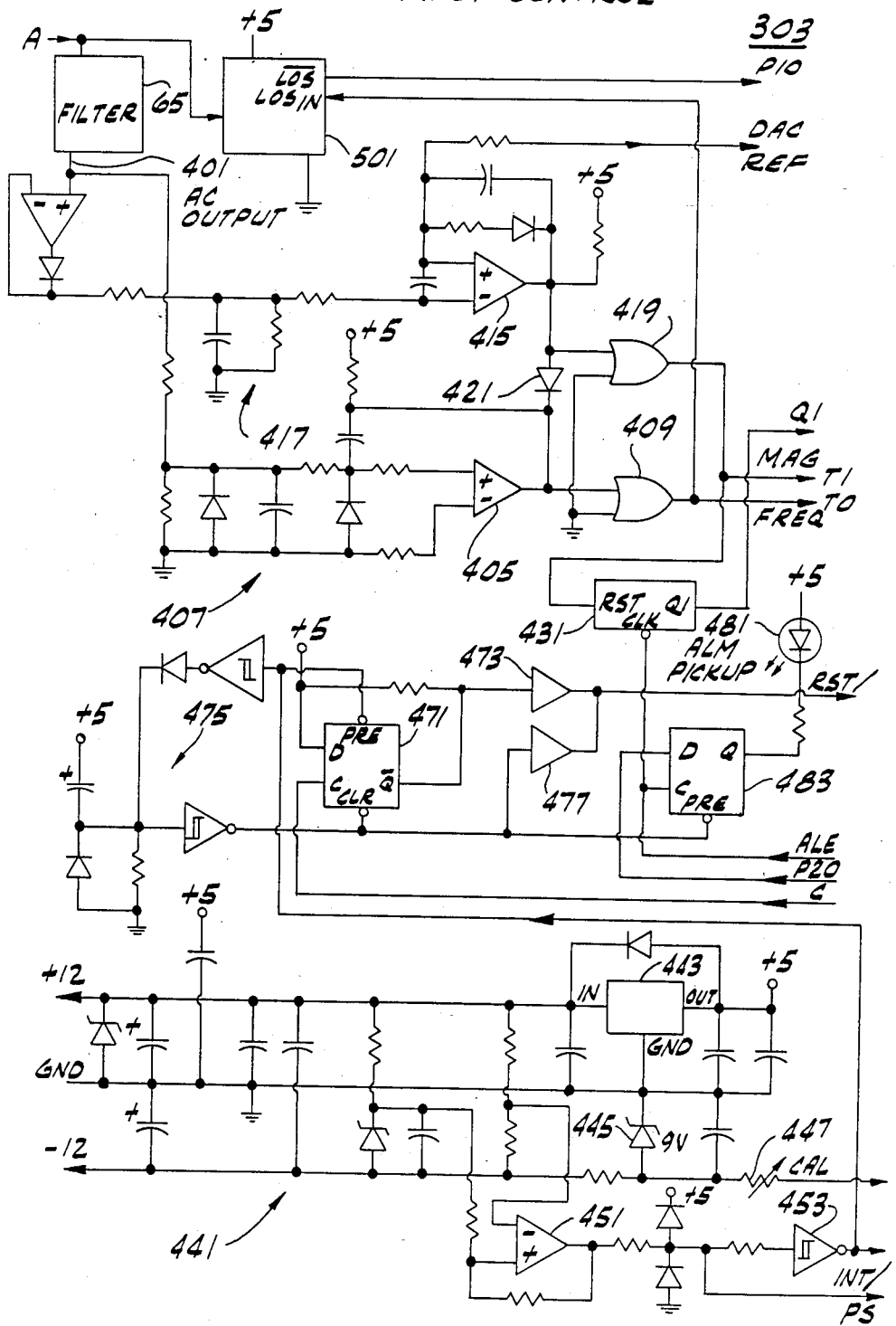
FIG. 8 is a schematic diagram of an input control circuit in part of FIG. 7.

In FIG. 8 the circuitry of input control 303 is detailed. Low pass filter 65 produces the AC output on a line 401. The AC output is rectified and supplied to the noninverting (+) input of a first open-collector comparator 405 by a voltage-dividing and diode-clamp circuit 407. An inverting (−) input of comparator 405 is resistively connected to ground so that its reference for comparison is zero. The output of comparator 405 is connected through an OR-gate 409 to testable input T0. Comparator 405 thus acts as a zero crossing detector.

The AC output from filter 65 is also rectified and supplied to the inverting (−) input of a second opencollector comparator 415 by a voltage-dividing and diode-clamp circuit 417. A noninverting (+) input of comparator 415 is resistively connected to the electrical level DACREF which provides a reference for comparison which is PU, PU1 or PU2 of FIG. 6 depending on which half-cycle of the AC output is analyzed. The output of comparator 415 is connected through an OR-gate 419 to testable input T1. Comparator 415 thus acts as means for holding input T1 low whenever the AC output voltage on line 401 exceeds the electrical level DACREF. An "O-Ring" diode 421 is connected between the outputs of the comparators 405 and 415 so that comparator 405 also holds input T1 low whenever the AC output voltage is negative.

When OR-gate 419 output is high, it lifts a reset high from a RST pin of a divide-by-two circuit 431. The clock input of circuit 431 is supplied by the Address Latch Enable line which toggles at a 400 KHz. rate. The output Q1 from circuit 431 is connected to the counter clock input CCK of counter 323 and to both latch clock inputs RCK of the counters 321 and 323 to operate the counters when needed as indicated by T1 low.

A power supply output circuit 441 has numerous capacitors for filtering and zener diodes for providing various regulated voltages. A voltage regulator chip 443 provides +5 logic level supply voltage from +12 volts input. A 9 volt Zener diode 445 provides a −9 volt regulated voltage to a variable resistor 447 connected by line CAL to DAC 331. A comparator 451 and an inverter 453 are connected to and responsive to the output circuit 441 to provide a low-active interrupt INT/to microcomputer 201 in the event of power supply failure or loss of operating power. A high active signal PS is provided in the same event to Watchdog 301.

Figure 9:
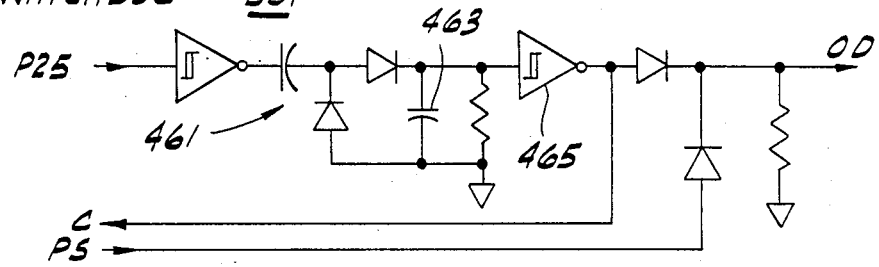
FIG. 9 is a schematic diagram of a watchdog circuit for FIG. 7.

In FIG. 9, Watchdog 301 is supplied with recurring pulses from pin P25 of microcomputer 201. These pulses are buffered by circuitry 461 and charge a capacitor 463, keeping the output of an inverter 465 low. If the pulses cease, the output of inverter 465 goes high, providing an output C to clock the input circuit 303. The output of inverter 465 is diode-ORed with power supply signal PS. If either the output of inverter 465 or signal PS goes high, an Output Disable signal OD is produced.

Output C from the Watchdog 301 of FIG. 9 clocks a D flip-flop 471 of FIG. 8 and supplies a Q/output low through a buffer 473 to activate the reset input RST/of microcomputer 201 because the Watchdog 301 has detected a loss of pulses. The input RST/is also activated for a predetermined initial time period on +5 volt logic supply voltage power up by a detector circuit 475 through a buffer 477.

An Alarm Pickup LED 481 in FIG. 8 is turned on as appropriate, to indicate that the alarm timer is timing, by the Q output a flip-flop 483 which has its D input connected to pin P20 and is clocked by the ALE line. This flip-flop 483 is preset on power up with Q output high (LED off) by the detector circuit 475.

Figure 10:
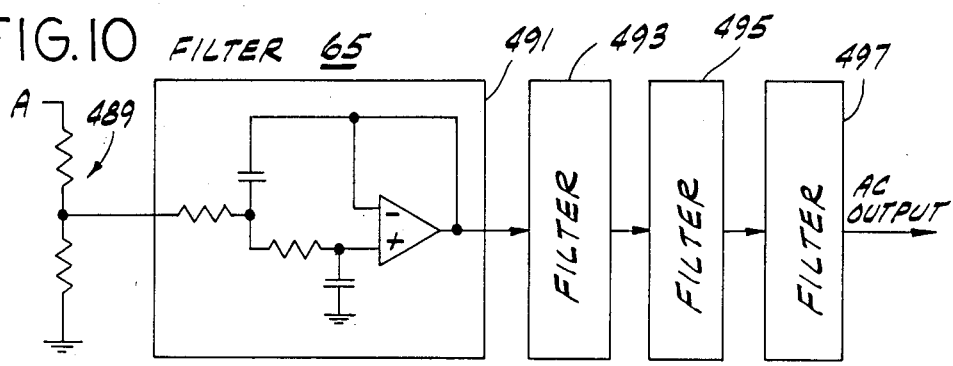
FIG. 10 is a schematic diagram of a filter circuit in FIG. 1 and in the input control circuit of FIG. 8.

In FIG. 10 filter 65 is an input voltage divider 489 followed by a set of 4 cascaded 2-pole low-pass Chebyshev active filter circuits 491, 493, 495 and 497, the circuit 491 being shown in schematic detail.

Figure 11:
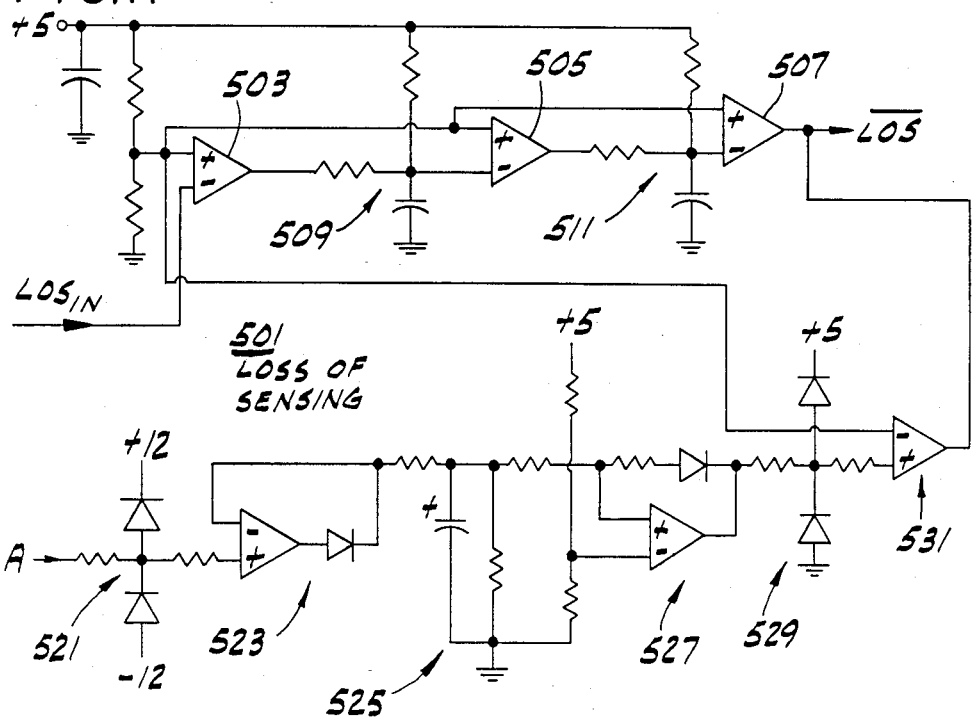
FIG. 11 is a schematic diagram of a loss-of-sensing circuit in FIG. 8.

In FIG. 11 a loss-of-sensing circuit 501 detects when the output of OR-gate 409 indicates frequency out of range, or insufficient AC output voltage from filter 65 to make effective volts-per-Hertz sensing possible. If loss-of-sensing occurs an active-low LOS/output is set low by circuit 501 and sent to pin P10 of microcomputer 201.

In FIG. 11 the loss-of-sensing circuit 501 has three comparators 503, 505 and 507, the last two of which have RC charging circuits 509 and 511 which are discharged repeatedly by normal occurrence of the cycles of the AC output. If the AC output is lost, comparator 507 output goes low activating the LOS/output.

Also in FIG. 11, further circuitry for magnitude loss-of-sensing is connected to the AC output of filter 65 on line A. A protective diode circuit 521 clamps any AC output from filter 65 outside the range ±12 volts. The AC output is rectified by an operational amplifier and diode circuit 523. The rectified output is supplied to an RC peak detecting circuit 525 which has approximately 1 millisecond charging time and one-second discharging time. The RC circuit 525 feeds a comparator circuit 527 which compares the AC output peak value with a preset reference level. Normally the peaks are above the reference level and the output of circuit 527 is high. The output of circuit 527 is clamped to that it does not go outside the range 0 to 5 volts set by a clamping circuit 529. Normally this output is high. Finally, an open-collector comparator 531 compares to a reference level the high or low output of circuit 527 as clamped by circuit 529, and the reference level is about 2/3 of 5 volts. The output of comparator 531 is wire-ORed to the LOS/loss of sensing output line with the output of comparator 507. If the AC output voltage on line A abnormally falls to 2-3 volts rms or less and does not recover within about 1 second, the output of comparator 531 goes low and brings loss of sensing LOS/low at microcomputer 201 pin P10.

When loss of sensing occurs, microcomputer 201 turns off all of the outputs for LEDs and causes all output contacts to go to their unenergized or deactuated states. Microcomputer 201 continues to monitor pin P10 and waits for more AC output to which it can synchronize its operations.

In FIG. 12, operations of microcomputer 201 commence with a START 601 and proceed to a subroutine Standard Check (STDCHK) 603 described in more detail in FIG. 13.

In FIG. 13 operations proceed from a BEGIN 605 to a step 607 in which a pulse is output at pin P25 to toggle the Watchdog circuit 301. Next, in a step 609 a test is made to determine whether both a resetting of the accumulated value for time trip purposes in a register TTTIMER is in progress, and whether this register has been decremented to its initial value of zero. If so, operations branch to a step 611 to turn off all LEDs of the bargraph 123, turn off the time trip output, clear the register TTTIMER to zero, and indicate that reset is complete by setting a flag RESET to zero. Upon completion of step 611, or if the test of step 609 is not met, then operations proceed to a step 613 to determine whether the Alarm timer has timed out, indicating an alarm condition. If so, then operations branch to a step 615 to turn on the Alarm output ALM at pin P16 to actuate the alarm output relay and close contacts 71 of FIG. 1. When step 615 is completed or the test of step 613 is not met, then operations go to a step 617 to determine whether the accumulated value in register TTTIMER has reached 100% value for time trip. If so, operations branch to a step 619 to turn on the Time Trip output on pin P17 to close contacts 81 of FIG. 1 and trip the circuit breaker 52 and the interrupter 41. Also in step 619, a reset condition is established by setting RESET to one (1) so that a resetting process can begin.

After step 619, or if the test of step 617 is not met, RETURN 621 is reached.

Referring again to FIG. 12 operations proceed from subroutine STDCHK 603 to a step 635 to test the T0 testable input to determine whether it has gone low, indicating that the sinusoidal AC output is negative. Until this occurs, a loop back to STDCHK subroutine 603 is made. Eventually, the AC output goes negative at zero crossing 171 of FIG. 6. Operations of FIG. 12 proceed from step 635 through a program point FREQB to a step 639. In step 639 a test is made using information developed from testable inputs T0 and T1 to determine whether the AC output is in its first half period 175. If not, operations branch directly to a program point A. If so, operations proceed to a step 641 to execute the subroutine STDCHK of FIG. 13. Then in a step 643 a subroutine for updating the LED bargraph 123 is executed, as more fully discussed in connection with FIG. 18. Following step 643 in FIG. 12, a step 645 reads in the reset rate parameter from the Reset Dial thumbwheels 122 of FIG. 3. Next, a testing step 647 determines whether the AC output of FIG. 6 has gone positive. Until it does, operations loop back to step 647 itself and in effect wait until zero crossing 173 of FIG. 6 is reached. Then operations proceed to a step 649 to read the external counters 321 and 323 which at this time hold a value representative of the width of a half-cycle of the AC output, which for present purposes is a first time period $t_1$ and also designated LOGFQ. The counters now having been read, they are reset by sending a Counter Clear low-active pulse from pin P12 to the CCLR/pins of the counters 321 and 323, whence point A of FIGS. 12 and 14 is reached.

Figure 14:
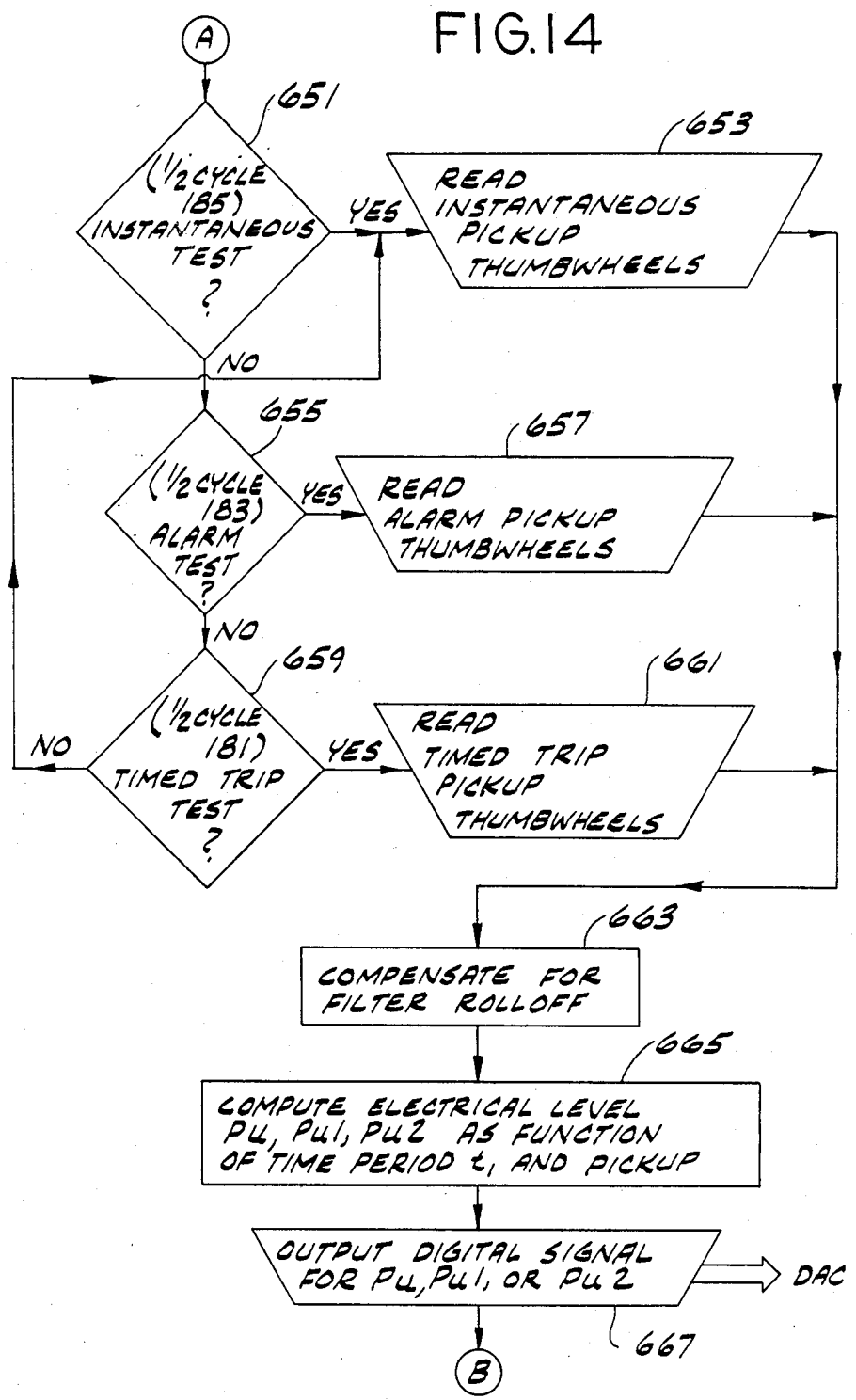

In FIG. 14 operations proceed from point A to a step 651 to determine when the AC output is positive, indicating the beginning of one of the positive half-cycles 181, 183 and 185. A modulo-3 software counter keeps track of the identity of the positive half-cycles. If half-cycle 185 is present, a branch is mae from step 651 to a step 653 to read a digital electrical signal representative of the volts-per-Hertz pickup value on Instantaneous Pibkup thumbwheels 106. If half-cycle 185 is not present, operations proceed from step 651 to a step 655 to determine whether half-cycle 183 is present. If half-cycle 183 is present, a branch is made from step 655 to a step 657 to read a digital electrical signal representative of the volts-per-Hertz pickup value on Alarm Pickup thumbwheels 102. If half-cycle 183 is not present, operations proceed from step 655 to a step 659 to determine whether half-cycle 181 is present. If half-cycle 181 is present, a branch is made from step 659 to a step 661 to read a digital electrical signal representative of the volts-per-Hertz pickup value on Time Trip Pickup thumbwheels 104. If half-cycle 181 is not present, operations default to step 653.

Operations proceed upon the completion of any of steps 653, 657 or 661 to go to a step 663 to compensate for filter rolloff. It is noted that the same AC peak voltage in the power system will produce different values of AC output peak voltage V from filter 65 depending on the system frequency $F = 1/(2t_1)$. In general a low-pass filter produces lower voltage V at higher frequencies F. A filter transfer characteristic T(F) expresses the ratio of the peak voltage V at each frequency F to the peak voltage V at some reference frequency $F_o$. The filter transfer characteristic T(F) is prestored in EPROM 221 for an expected range of frequencies. The value of T(F) corresponding to the first time period $t_1$ (FIG. 6) is obtained in step 663 and then used as a multiplying factor to adjust the electrical level PU, PU1 or PU2 obtained from the respective equations (11), (12) or (13). The adjusted electrical level PU, PU1 or PU2 corresponding to the half-cycle 181, 183 or 185 respectively is computed in step 665 and then output as a digital signal to DAC 331, whence a point B of FIGS. 14 and 15 is reached.

Figure 15:
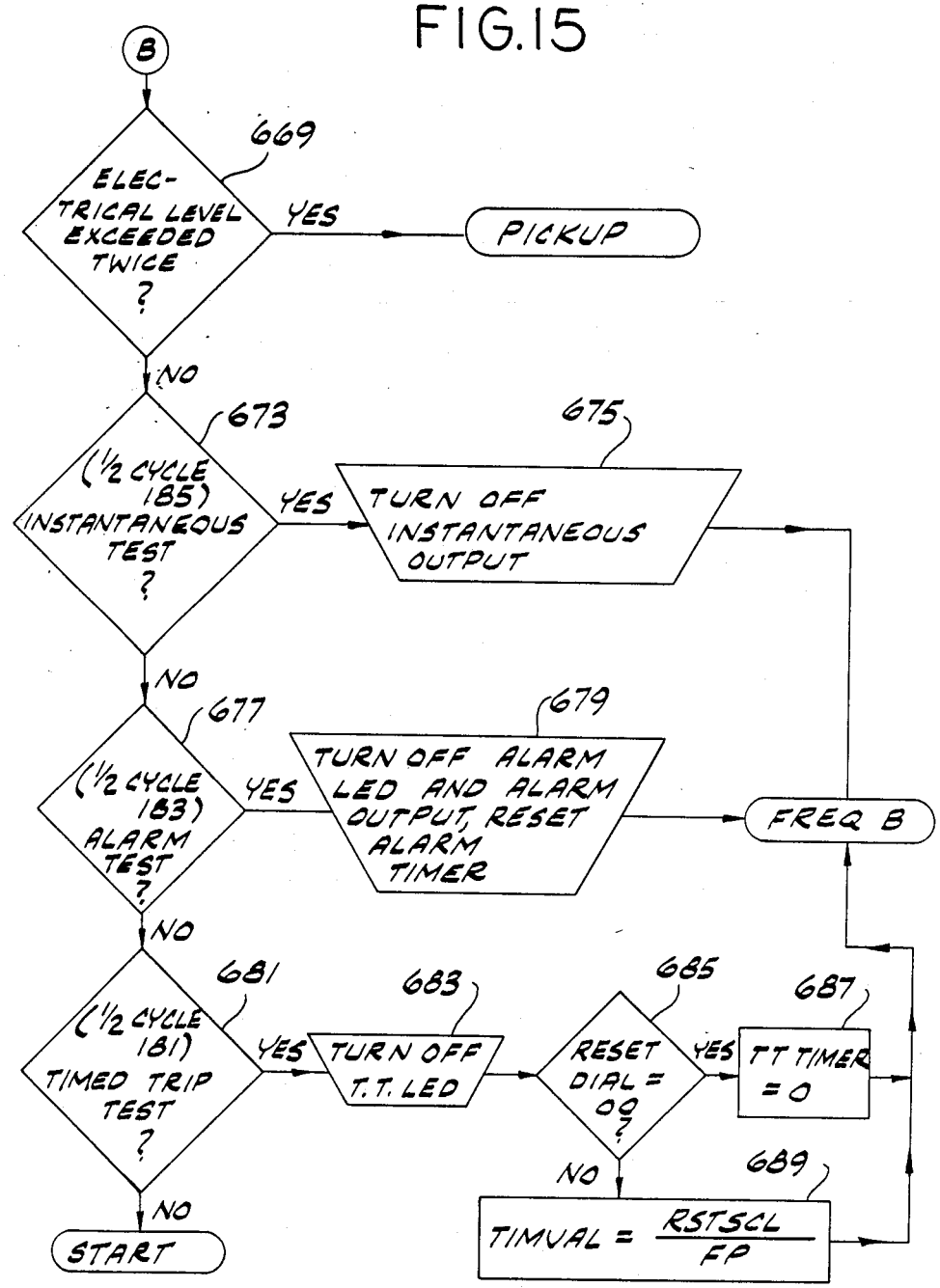

In FIG. 15 operations proceed from point B to a step 669 to determine from repeated checking of testable inputs T1 and T0 during a given positive half-cycle such as 181 whether the electrical level (e.g. PU) is exceeded in two repeated checks. If so, operations branch to a PICKUP point in the software of FIGS. 15 and 16. If not, operations proceed to a test step 673. If half-cycle 185 is occurring in step 673, operations branch to a step 675 to turn off the instantaneous output relay and open contacts 85 of FIG. 1 because the instantaneous pickup level is not exceeded. If half-cycle 185 is not occurring, operations proceed from step 673 to a test step 677 to determine whether half-cycle 183 is occurring. If so, operations branch to a step 679 to turn off the Alarm LED and Alarm output relay and open contacts 71 of FIG. 1 because the alarm pickup level is not exceeded. If half-cycle 183 is not occurring, operations proceed from step 677 to a test step 681 to determine whether half-cycle 181 is occurring. If so, operations branch to a step 683 to turn off the Time Trip LED. After step 683 a test 685 checks whether the Reset dial 122 of FIG. 3 is set to "00", and if so the register TTTIMER is set to its initial value of zero in a step 687. If the Reset dial 122 is not set to "00", then operations branch from step 685 to compute an incremental value TIMVAL according to equation (15) in a step 689. After any of steps 675, 679, 687 or 689 is executed, operations loop back to point FREQB of FIGS. 15 and 12 and continue with step 639 of FIG. 12. If the test of step 681 of FIG. 15 is not met, operations default to START of FIGS. 15 and FIG. 12 and continue with step 603 of FIG. 12. In this way, the operations of microcomputer 201 are repeatedly performed.

Figure 16:
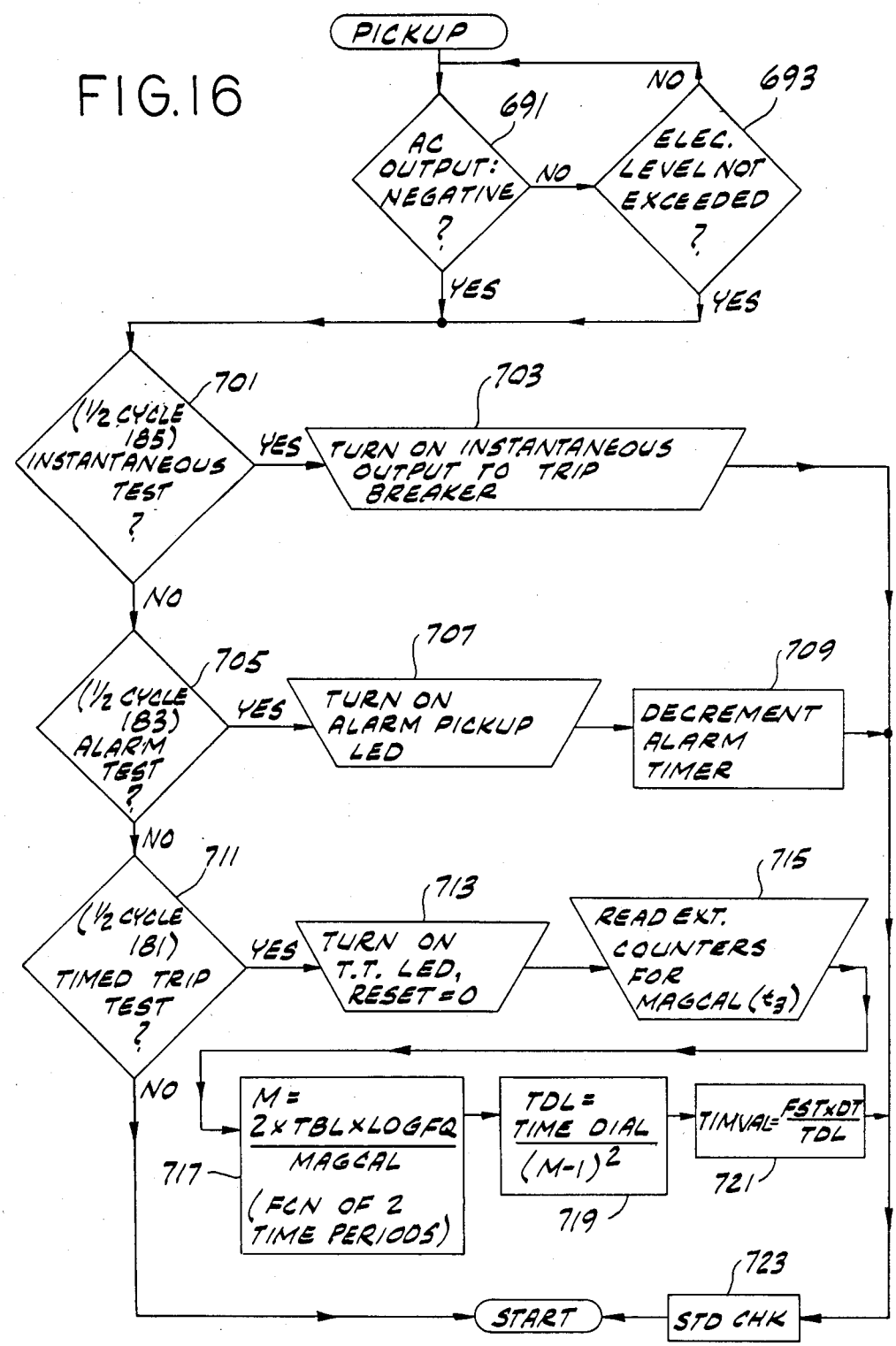

In FIG. 16, operations which reached point PICKUP of FIG. 15 proceed to a step 691 to determine whether the AC output from filter 65 has become negative (low at testable input T0), which indicates that the positive half-cycle is completed. If not, operations go to a step 693 to determine whether the electrical level used for pickup purposes is no longer exceeded (high at testable input T1). If the electrical level is still exceeded (low at T1), then operations loop back to step 691 until either the electrical level is no longer exceeded in step 693 or the AC output goes negative in step 691, whence a test step 701 is reached.

If half-cycle 185 is occurring, operations branch from step 701 to a step 703 to turn on the instantaneous output relay and close contacts 85 of FIG. 1 to trip breaker 52 and interrupter 41 because the instantaneous pickup level is exceeded. If half-cycle 185 is not occurring, operations proceed from step 701 to a test step 705 to determine whether half-cycle 183 is occurring. If so, operations branch to a step 707 to turn on the Alarm LED because the alarm pickup level is exceeded. After step 707, a step 709 decrements an alarm timer which was originally initialized at a value corresponding to the Alarm Time Delay on thumbwheels 114. If half-cycle 183 is not occurring, operations proceed from step 705 to a test step 711 to determine whether half-cycle 181 is occurring. If so, operations branch to a step 713 to turn on the Time Trip LED 117 of FIG. 2 (295 in FIG. 7). Also in step 713, the RESET flag is set to zero since resetting should not occur when the pickup level PU is exceeded. After step 713 a step 715 reads external counters 321 and 323 to obtain a measured time period $t_3$ of FIG. 6 (also designated MAGCAL herein). Next in a step 717, the ratio M is computed as a function of the two time periods $t_1$ (LOGFQ) and $t_3$ (MAGCAL) according to equation (10). Then in a step 719, a time delay length TDL is computed according to the inverse square relationship in M and from the Time Dial setting on thumbwheels 120 according to equation (1). Operations then proceed to a step 721 to compute an incremental value TIMVAL according to equation (3). After any of steps 703, 709, or 721 is executed, operations go to execute subroutine STDCHK in a step 723 and then loop back to START in the main loop of FIG. 12 to continue with step 603 of FIG. 12.

Figure 17:
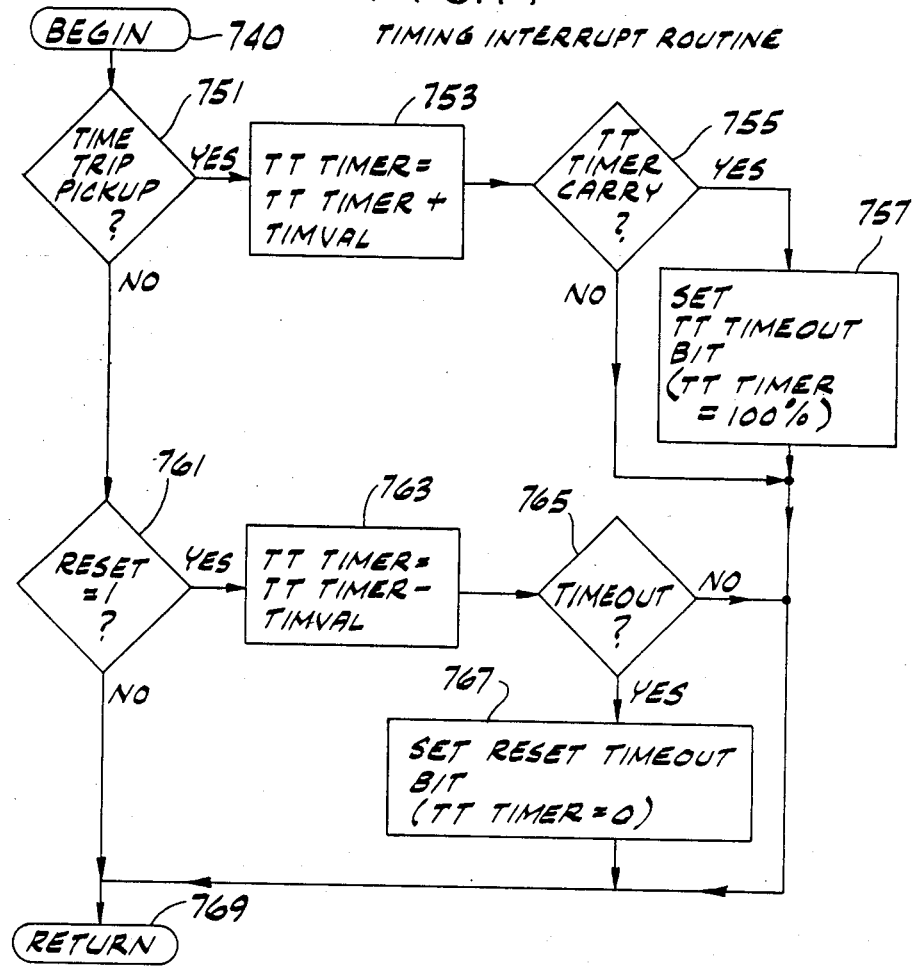

In FIG. 17 a timing interrupt routine is executed by microcomputer 201 every 10 milliseconds whereby operations in the main loop or any subroutine are interrupted so that the microcomputer performs the steps of FIG. 17. Upon interrupt operations proceed from a BEGIN 740 to a test step 751 to determine whether operations in the main loop are in a time trip pickup state as indicated by testable input T0 high, testable input T1 low, and cycle counter indicating cycle 181. If there is time trip pickup, operations branch to a step 753 to increase the value in register TTTIMER by the amount TIMVAL according to equation (4). Next, a test step 755 determines whether there is a "carry" from register TTTIMER, meaning that it has reached its maximum value. If so, then a step 757 sets a timeout bit TTTIMEOUT which signifies that the register TTTIMER has reached a 100% value which will cause a breaker trip when subroutine STDCHK is next executed (see steps 617 and 619 of FIG. 13).

Further in FIG. 17, operations go from step 751 to a test step 761 if there is no time trip pickup condition. Test step 761 determines whether there is a reset condition underway (resetting of TTTIMER) as indicated by flag RESET=1. If so, resetting is indicated and operations branch to a step 763 to decrease the value in register TTTIMER by the amount TIMVAL according to equation (17). Then a test step 765 determines whether the value in TTTIMER has been reduced to its initial value of zero, i.e. that the register in its function as a "reset timer" has timed out. If so, a step 767 then sets a Reset Timeout Bit indicating that TTTIMER is zero for STDCHK purposes.

In FIG. 17 a RETURN 769 is reached in the interrupt routine if any of the following occur: (1) RESET is not one in step 761, (2) there is no TTTIMER carry in step 755, (3) the contents of TTTIMER are not zero in step 765, (4) step 757 is completed, or (5) step 767 is completed. Upon reaching RETURN 769, the timing interrupt routine is completed and operations go back to whatever point in the main loop or subroutines of the rest of the software at which the interrupt occurred.

In FIG. 18, a further subroutine to update bargraph 123 corresponding to step 643 of FIG. 12 is described in greater detail. Operations commence with BEGIN 800 and proceed to compute a whole number NR equal to the first integer less than or equal to ten times the ratio of the value in register TTTIMER to its maximum value FST. In other words, NR is a whole number between 0 and 10 representative of an accumulated value in TTTIMER. Next, in a step 803 a table access according to Table I hereinbelow is made to convert the whole number NR to an activation byte BAROUT for turning on an appropriate number of the 8 LEDs in FIG. 7 that are fed by latch 271.

TABLE I

| NR | HEX | BINARY |
|----|-----|--------|
| 0  | 00  | 00000000 |
| 1  | 01  | 00000001 |
| 2  | 03  | 00000011 |
| 3  | 07  | 00000111 |
| 4  | 0F  | 00001111 |
| 5  | 1F  | 00011111 |
| 6  | 3F  | 00111111 |
| 7  | 7F  | 01111111 |
| 8  | FF  | 11111111 |
| 9  | FF  | 11111111 |
| 10 | FF  | 11111111 |

(LEDs in bargraph are connected to that least significant binary bit is supplied to lowest value LED and most significant binary bit is supplied to 80% value LED.)

Because there are 8 bits in a byte corresponding to the first 8 LEDs, and there are 10 LEDs in the array 277 to be controlled, additional steps in routine 643 of FIG. 18 are needed. After step 803, a test step 805 determines whether NR is ten. If so, a step 807 activates pins P26 and P27 to turn on the LEDs indicative of 90% and 100% accumulated value. If in step 805 NR is not ten, a test step 809 determines whether NR is nine. If so, a step 811 activates only pin P26 to turn on the LED indicative of 90% accumulated value. If in step 809 NR is not nine, then a step 813 clears the two high order bits for 90% and 100% by bringing pins P26 and P27 low. After any oil steps 807, 811 or 813 are completed, a step 815 is executed to send the logic levels currently in the two high order bits for P26 and P27 and the logic levels in the BAROUT byte from Table 1 to the LEDs in array 277. In this way the Time Progression Display faithfully and advantageously displays the accumulated value in the register TTTIMER. After step 815, a RETURN 817 is reached.

It is apparent that the volts-per-Hertz relay 59 can be implemented in numerous alternative embodiments entirely in hardware, in hardware with firmware components, in a microcomputer with associated input and output outboard hardware as illustrated herein, and in a microcomputer with essentially no outboard hardware.

The exposition of a theory of operation with formulas hereinabove describes some of the preferred embodiments and does not limit the spirit and scope of the invention.

In view of the above, it will be seen that the several objects of the invention are achieved and other advantageous results attained.

As various changes could be made in the above constructions and method steps without departing from the scope of the invention, it is intended that all matter contained in the above description or shown in the accompanying drawings shall be interpreted as illustrative and not in a limiting sense.

What is claimed is:

1. A protective relay for use in an electrical power system with a circuit breaker for connecting and disconnecting first and second electrical conductors which are energizable with an AC voltage, and means for sensing the AC voltage to produce an AC output that has zero crossings and a time period between zero crossings, the protective relay comprising:
   means for supplying an electrical signal representing a preselected pickup value of volts-per-Hertz for the relay; and
   means responsive to the AC output and to the electrical signal for generating an electrical level as a function of both the time period between zero crossings and the pickup value and for producing a trip signal for the relay to cause the circuit breaker to disconnect the conductors when the AC output exceeds the electrical level, whereby the circuit breaker is tripped when a volts-per-Hertz value of the AC voltage exceeds the preselected pickup value of volts-per-Hertz for the relay.

2. A protective relay as set forth in claim 1 wherein said means for generating includes means responsive to the AC output and to the electrical signal supplying means for measuring a value of the time period between a pair of the zero crossings and producing the electrical reference level as a direct function of the pickup value divided by the value of the time period between zero crossings.

3. A protective relay as set forth in claim 1 wherein said means for generating includes means for producing a second electrical level as a function of the time period, which second electrical level is less than the first electrical level, for measuring a second time period between zero crossings during which the AC output exceeds the second electrical level, and for generating a second electrical signal as a function of the first and second time periods to represent a ratio of volts-per-Hertz of the AC voltage to a predetermined value of volts-per-Hertz.

4. A protective relay as set forth in claim 3 further comprising adjustable means for supplying an additional electrical signal representing the predetermined value of volts-per-Hertz to said means for generating.

5. A protective relay as set forth in claim 1 wherein said means for generating includes means for producing a second electrical level as a function of the time period between zero crossings, which second electrical level is less than the first electrical level, measuring a second time period during which the AC output exceeds the second electrical level, generating a second electrical signal as a function of the first and second time periods to represent a ratio of volts-per-Hertz of the AC voltage to a predetermined value of volts-per-Hertz, and when the ratio exceeds a preestablished amount repeatedly producing a third electrical signal and increasing it in magnitude by an amount which is a direct function of the excess of the ratio over the preestablished amount.

6. A protective relay as set forth in claim 5 further comprising means for producing a display indicative of the magnitude of the third electrical signal.

7. A protective relay as set forth in claim 1 wherein said means for generating also includes means for repeatedly producing a second electrical level less than the first electrical level and that varies as a function of an interval between zero crossings over time, repeatedly measuring a second time period during which the AC output exceeds the second electrical level, repeatedly generating a second electrical signal that varies over time as a function of the interval and second time period, repeatedly producing a third electrical signal when the second electrical signal exceeds a threshold magnitude and repeatedly increasing the third electrical signal by amounts depending on the second electrical signal, and producing a time trip signal for the relay to cause the circuit breaker to disconnect the conductors when the third electrical signal exceeds a predetermined level.

8. A protective relay as set forth in claim 7 further comprising means for supplying a reset control signal, said means for generating including means responsive to the reset control signal and operative upon an occurrence of the time trip signal for progressively decreasing the third electrical signal in magnitude during a rest time interval dependent upon the reset control signal.

9. A protective relay for use in an electrical power system having electrical conductors which are energizable with an AC voltage, the protective relay comprising:
    means for sensing the AC voltage to produce an AC output that has zero crossings and a time period between zero crossings;
    means for supplying an electrical signal representing a preselected pickup value of volts-per-Hertz for the relay; and
    means responsive to the AC output and to the electrical signal for generating an electrical level as a function of both the time period between zero crossings and the pickup value and for producing an output signal for the relay when the AC output exceeds the electrical level to indicate that a volts-per-Hertz value of the AC voltage exceeds the preselected pickup value of volts-per-Hertz for the relay.

10. A protective relay as set forth in claim 9 wherein said generating means comprises means for producing the output signal for the relay when the AC output exceeds the electrical level for a predetermined length of time.

11. A protective relay as set forth in claim 10 further comprising electrical alarm control contacts operable in response to said output signal.

12. A protective relay as set forth in claim 9 wherein said generating means comprises means for producing the output signal for the relay substantially instantaneously when the AC butput exceeds the electrical level.

13. A protective relay as set forth in claim 12 further comprising instantaneous trip contacts operable in response to said output signal.

14. A protective relay as set forth in claim 9 further comprising means for supplying an additional pickup value signal representing a preselected time-trip pickup value of volts-per-Hertz for the relay, and said means for generating includes means for repeatedly producing a second electrical level that varies as a function of the time-trip pickup value and an interval between zero crossings over time, repeatedly measuring a second time period during which the AC output exceeds the second electrical level, repeatedly generating a second electrical signal that varies over time as a function of the interval and second time period, repeatedly producing a third electrical signal when the second electrical signal exceeds a threshold magnitude and repeatedly increasing the third electrical signal by amounts depending on the second electrical signal, and producing a time trip signal for the relay when the third electrical signal exceeds a predetermined level.

15. A protective relay as set forth in claim 14 further comprising means for supplying a reset control signal, said means for generating including means responsive to the reset control signal and operative upon an occurrence of the time trip signal for progressively decreasing the third electrical signal in magnitude during a reset time interval dependent upon the reset control signal.

16. A protective relay as set forth in claim 9 wherein the AC voltage has a value of actual volts-per-Hertz, further comprising means for supplying an additional pickup value signal representing a preselected time-trip pickup value of volts-per-Hertz for the relay, said generating means also including means for generating a further electrical signal which increases in magnitude during the time when the value of actual volts-per-Hertz exceeds the time-trip pickup value and which decreases in magnitude during the time when the value of actual volts-per-Hertz is less than the time-trip pickup value of volts-per-Hertz; the relay also comprising means for producing a display indicative of the magnitude of the further electrical signal as it increases and decreases in magnitude.

17. A protective relay as set forth in claim 9 wherein the AC voltage has a value of actual volts-per-Hertz, further comprising means for supplying a time-trip pickup signal representing a preselected time-trip pickup value of volts-per-Hertz for the relay, and means for supplying a reset control signal representing a reset rate parameter for the relay, said generating means also including means responsive to the AC output for generating a second electrical signal that increases in magnitude from an initial value to an accumulated value when the actual volts-per-Hertz exceeds the time-trip pickup value, and responsive to the reset control signal for decreasing the magnitude of the second electrical signal from its accumulated value to the initial value in a reset time interval which varies directly with the accumulated value if the value of actual volts-per-Hertz is less than the time-trip pickup value throughout the reset time interval.

18. A protective relay as set forth in claim 9 wherein the AC output has half-cycles of two opposite polarities and said means for generating also includes means for measuring the time period between zero crossings during a half-cycle of one polarity and means for comparing the AC output with the electrical level during a half-cycle of the opposite polarity.

19. A protective relay as set forth in claim 9 wherein the AC output has half-cycles, further comprising means for supplying a second electrical signal representing a second preselected pickup value of volts-per-Hertz for the relay, said means for generating including digital computer means for computing in first and second half-cycles of the AC output different values of the electrical level by said function of the time period and pickup value corresponding to the first-named preselected pickup value and the second preselected pickup value respectively and for producing the output signal when the AC output exceeds the value of the electrical level so computed in the first half cycle and for producing another relay signal when the AC output exceeds the value of the electrical level so computed in the second half cycle.

20. A protective relay as set forth in claim 9 wherein said means for sensing includes a low-pass filter.

21. A protective relay as set forth in claim 20 wherein said filter has a rolloff characteristic and said means for generating includes a digital computer programmed to generate the electrical level so as to compensate for the rolloff characteristic at a frequency corresponding to the time period between zero crossings.

22. A protective relay as set forth in claim 9 wherein said means for generating includes comparing means for detecting the zero crossings in the AC output, counter means connected to said comparing means for measuring the time period between zero crossings, and a digital computer connected to said means for supplying the electrical signal representing the pickup value and also fed by said comparing means and said counter means and programmed to produce a digital signal representing the electrical level which is a function of both the time period between zero crossings and the pickup value.

23. A protective relay as set forth in claim 9 wherein said means for generating includes first comparing means for detecting the zero crossings in the AC output, counter means connected to said first comparing means for measuring the time period between zero crossings, a digital computer connected to said means for supplying the electrical signal representing the pickup value and also fed by said first comparing means and said counter means and programmed to produce a digital signal representing the electrical level which is a function of both the time period between zero crossings and the pickup value, a digital-to-analog converter for converting the digital signal to an analog signal which also represents the electrical level, and second comparing means connected to the AC output and to the analog signal for detecting when the AC output exceeds the analog signal in magnitude, the digital computer also being fed by the second comparing means and programmed to produce the output signal when an excess is detected by the second comparing means.

24. A protective relay as set forth in claim 9 wherein said means for generating includes a digital computer and the relay further comprises a series of light-emitting means connected to said digital computer to indicate an accumulation of time toward a trip condition.

25. A protective relay for use in an electrical power system with a circuit breaker for connecting and disconnecting first and second electrical conductors which are energizable with an AC voltage, the protective relay comprising:
 means for sensing the AC voltage to produce an AC output that has zero crossings;
 means for supplying an electrical signal representing a pickup value of volts-per-Hertz for the relay; and
 means responsive to the AC output and to the electrical signal for generating an electrical level as a function of both the pickup value and a first time period between a pair of the zero crossings, for measuring a second time period during which the AC output exceeds the electrical level, and for generating a second electrical signal as a function of the first and second time periods so that the second electrical signal represents a ratio of volts-per-Hertz of the AC voltage to the pickup value of volts-per-Hertz. Hertz.

26. A protective relay as set forth in claim 25 wherein said means for generating includes means operable when the ratio exceeds a predetermined value for repeatedly producing a third electrical signal and increasing it in magnitude by an amount which is a direct function of the excess of the ratio over the predetermined value.

27. A protective relay as set forth in claim 26 further comprising means for producing a display indicative of the magnitude of the third electrical signal.

28. A protective relay as set forth in claim 25 wherein said means for generating also includes means operable when the ratio exceeds a predetermined value for repeatedly producing a third electrical signal and increasing it in magnitude by an amount which is a direct function of the excess of the ratio over the predetermined value, and for producing a time trip signal for the relay to cause the circuit breaker to disconnect the conductors when the third electrical signal exceeds a predetermined level.

29. A protective relay as set forth in claim 28 further comprising means for supplying a reset control signal, said means for generating including means responsive to the reset control signal and operative upon an occurrence of the time trip signal for progressively decreasing the third electrical signal in magnitude during a reset time interval dependent upon the reset control signal.

30. A protective relay as set forth in claim 25 wherein the AC voltage has a value of actual volts-per-Hertz and said generating means also includes means for generating a further electrical signal which increases in magnitude during the time when the value of actual volts-per-Hertz exceeds the pickup value and which decreases in magnitude during the time when the value of actual volts-per-Hertz is less than the pickup value of volts-per-Hertz; the relay also comprising means for producing a display indicative of the magnitude of the further electrical signal as it increases and decreases in magnitude.

31. A protective relay as set forth in claim 25 wherein the AC voltage has a value of actual volts-per-Hertz, further comprising means for supplying a reset control signal representing a reset rate parameter for the relay, said generating means also including means responsive to the AC output for generating a third electrical signal that increases in magnitude from an initial value to an accumulated value when the actual volts-per-Hertz exceeds the pickup value, and responsive to the reset control signal for decreasing the magnitude of the third electrical signal from its accumulated value to the initial value in a reset time interval which varies directly with the accumulated value if the value of actual volts-per-Hertz is less than the pickup value throughout the reset time interval.

32. A protective relay as set forth in claim 25 wherein the AC output has half-cycles of two opposite polarities and said means for generating also includes means for measuring the first time period between a pair of the zero crossings during a half-cycle of one polarity and means for comparing the AC output with the electrical level during a half-cycle of the opposite polarity.

33. A protective relay as set forth in claim 25 wherein the AC output has half-cycles, further comprising means for supplying a further signal representing a second pickup value of volts-per-Hertz for the relay, said means for generating also including digital computer means for computing in first and second half-cycles of the AC output first and second values of the electrical level by the function of first time period and pickup value corresponding to the first-named and second pickup values respectively and for producing the second electrical signal when the AC output exceeds the first value of the electrical level in the first half cycle and for producing another relay signal when the AC output exceeds the second value of the electrical level in the second half cycle.

34. A protective relay as set forth in claim 25 wherein said means for sensing includes a low-pass filter.

35. A protective relay as set forth in claim 34 wherein said filter has a rolloff characteristic and said means for generating includes digital computer means programmed to generate the electrical level compensating for the rolloff characteristic at a frequency corresponding to the first time period.

36. A protective relay as set forth in claim 25 wherein said means for generating includes a digital computer and the relay further comprises a series of light-emitting means connected to said digital computer to indicate an accumulation of a numerial value toward a trip condition.

37. A protective relay for use in an electrical power system with a circuit breaker for connecting and disconnecting first and second electrical conductors which are energizable with an AC voltage that has a value of actual volts-per-Hertz, and with means for sensing the AC voltage to produce an AC output, the protective relay comprising:
means for supplying a first electrical signal representing a preselected pickup value of volts-per-Hertz for the relay;
means responsive to the AC output and to the electrical signal for generating a second electrical signal which increases in magnitude during the time when the value of actual volts-per-Hertz exceeds the pickup value of volts-per-Hertz for the relay and the second electrical signal decreases in magnitude during the time when the value of actual volts-per-Hertz is less than the pickup value of volts-per-Hertz; and
means for producing a display indicative of the magnitude of the second electrical signal as it increases and decreases in magnitude.

38. A protective relay as set forth in claim 37 wherein said means for producing a display indicative of the magnitude of the second electrical signal includes a series of display means connected to said means for generating the second electrical signal so that the series of display means are activated in a first order as the second electrical signal increases in value and are deactivated in reverse when the second electrical signal decreases in value.

39. A protective relay as set forth in claim 38 wherein said means for generating the second electrical signal also includes means for computing a whole number directly related to the magnitude of the second electrical signal which number is equal to the number of the display means which are to be activated to represent that magnitude and for supplying a set of activating signals equal in number to the whole number so computed in order to activate the corresponding number of display means.

40. A protective relay as set forth in claim 37 wherein said means for generating the second electrical signal also includes means for doing so by repeatedly producing a third electrical signal that varies as a function of both the pickup value and a first time interval between zero crossings over time, repeatedly measuring a second time interval during which the AC output exceeds the third electrical signal in magnitude, repeatedly generating a fourth electrical signal that varies over time as a function of the first and second time intervals, repeatedly increasing the second electrical signal by amounts depending on the fourth electrical signal, and producing a time trip signal for the relay to cause the circuit breaker to disconnect the conductors when the second electrical signal exceeds a predetermined level.

41. A protective relay as set forth in claim 37 further comprising means for supplying a reset control signal representing a reset rate parameter for the relay, said generating means also including means responsive to the reset control signal for decreasing the magnitude of the second electrical signal from a first value that it has reached during the time when the actual volts-per-Hertz exceeds the pickup value to a second value in a reset time interval which varies directly with the first value.

42. A protective relay as set forth in claim 37 wherein the AC output has half-cycles and zero crossings, further comprising means for supplying a further signal representing a second pickup value of volts-per-Hertz for the relay, said means for generating including digital computer means for computing in first and second half-cycles of the AC output first and second values of an electrical level as a function of a time interval between zero crossings and a pickup value corresponding to the first-named and second pick-up values respectively and for producing a third electrical signal for increasing the second electrical signal when the AC output exceeds the first value of the electrical level in the first half cycle and for producing another relay signal when the AC output exceeds the second value of the electrical level in the second half cycle.

43. A protective relay as set forth in claim 37 further comprising means for producing a trip output for the circuit breaker when the magnitude of the second electrical signal reaches a predetermined value and means for supplying a reset control signal, said means for generating including means responsive to the reset control signal and operative upon an occurrence of the trip output for progressively decreasing the second electrical signal in magnitude during a reset time interval dependent upon the reset control signal.

44. A protective relay for use in an electrical power system with a circuit breaker for connecting and disconnecting first and second electrical conductors which are energizable with an AC voltage that has a value of actual volts-per-Hertz, the protective relay comprising:
means for sensing the AC voltage to produce an AC output;
means responsive to the AC output for generating an electrical signal that increases in magnitude from an initial value to an accumulated value when the actual volts-per-Hertz exceeds a preselected pickup level of volts-per-Hertz for the relay; and
means for supplying a reset control signal representative of a reset rate parameter for the relay, said generating means including means responsive to the reset control signal for decreasing the magnitude of the electrical signal from its accumulated value to the initial value in a reset time interval which varies directly with the accumulated value if the value of actual volts-per-Hertz is less than the pickup level of volts-per-Hertz throughout the reset time interval.

45. A protective relay as set forth in claim 44 wherein said reset control signal supplying means includes adjustable means for establishing a reset slope in seconds per unit of accumulated value of the electrical signal.

46. A protective relay as set forth in claim 44 wherein said reset control signal supplying means includes adjustable means for establishing a rate of decrease of magnitude of the electrical signal which is substantially independent of the accumulated value of the electrical signal.

47. A protective relay as set forth in claim 44 wherein said means for generating includes means for resuming an increase in the magnitude of the electrical signal when the actual volts-per-Hertz exceeds the pickup value and the electrical signal has not been decreased in value to the initial value.

48. A protective relay as set forth in claim 44 wherein said means for generating includes first comparing means for detecting zero crossings in the AC output, counter means for measuring a time interval between the zero crossings, digital computer means fed by the first comparing means and said counter means and programmed to produce a digital signal having a value which is a function of both the time interval and the pickup level, a digital-to-analog converter for converting the digital signal to an analog signal, and second comparing means responsive to the AC output and the analog signal for detecting when the AC output exceeds the analog signal in magnitude, the digital computer also being fed by the second comparing means and programmed to produce and increase the electrical signal in magnitude when the second comparing means detects that the AC output exceeds the analog signal in magnitude.

49. A protective relaying method for use in an electrical power system with a circuit breaker for connecting and disconnecting first and second electrical conductors which are energizable with an AC voltage, the method comprising the steps of:
   sensing the AC voltage to produce an AC output that has zero crossings and a time period between zero crossings;
   supplying an electrical signal representing a preselected pickup value of volts-per-Hertz;
   generating an electrical level as a function of both the time period and the pickup value; and
   producing an output signal when the AC output exceeds the electrical level so that the output signal is produced when a volts-per-Hertz value of the AC voltage is in excess of the preselected pickup value of volts-per-Hertz.

50. The method as set forth in claim 49 further comprising the step of tripping the circuit breaker in response to the output signal to disconnect the conductors when the AC output exceeds the electrical level, whereby the circuit breaker is tripped when a volts-per-Hertz value of the AC voltage exceeds the preselected pickup value of volts-per-Hertz.

51. The method as set forth in claim 49 further comprising the steps of measuring a second time period during which the AC output exceeds the electrical level, and generating a second electrical signal as a function of the first-named time period and the second time period so that the second electrical signal represents a ratio of volts-per-Hertz of the AC voltage to the pickup value of volts-per-Hertz.

52. A protective relaying method for use in an electrical power system with a circuit breaker for connecting and disconnecting first and second electrical conductors which are energizable with an AC voltage that has a value of actual volts-per-Hertz, and with means for sensing the AC voltage to produce an AC output, the method comprising the steps of:
   supplying a first electrical signal representing a preselected pickup value of volts-per-Hertz;
   generating a second electrical signal which increases in magnitude during the time when the value of actual volts-per-Hertz exceeds the pickup value of volts-per-Hertz for the relay and the second electrical signal decreases in magnitude during the time when the value of actual volts-per-Hertz is less than the pickup value of volts-per-Hertz; and
   producing a display indicative of the magnitude of the second electrical signal as it increases and decreases in magnitude.

53. A protective relaying method for use in an electrical power system with a circuit breaker for connecting and disconnecting first and second electrical conductors which are energizable with an AC voltage that has a value of actual volts-per-Hertz, the method comprising the steps of:
   generating an electrical signal that increases in magnitude from an initial value to an accumulated value when the actual volts-per-Hertz exceeds a preselected pickup level of volts-per-Hertz;
   supplying a reset control signal representative of a reset rate parameter; and
   decreasing the magnitude of the electrical signal from its accumulated value to the initial value in a reset time interval which varies directly with the accumulated value if the value of actual volts-per-Hertz is less than the pickup level of volts-per-Hertz throughout the reset time interval.

54. A protective relay for use with electrical apparatus to be protected that is energizable with an AC voltage having a varying value of actual volts-per-Hertz, and for use with means for sensing the AC voltage to produce an AC output and with a circuit breaker for connecting and, in response to an electrical trip, disconnecting the electrical apparatus, the protective relay comprising:
   means responsive to the AC output for generating an electrical signal which changes in value generally representing heating of the apparatus to be protected when the actual volts-per-Hertz exceeds a preselected pickup level of volts-per-Hertz for the relay and for generating a trip output for initiating the electrical trip when the electrical signal reaches a predetermined value; and
   means for supplying a reset control signal, said means for generating including means responsive to the reset control signal upon an occurrence of the trip output for resetting the electrical signal in value so that the resetting consumes a reset time period generally corresponding to a length of time for the apparatus to be protected to cool.

55. A protective relay as set forth in claim 54 wherein said means for supplying the reset control signal includes adjustable means for establishing a reset slope in seconds per unit of value of the electrical signal.

56. A protective relay as set forth in claim 54 wherein said means for supplying the reset control signal includes adjustable means for establishing a rate of decrease of magnitude of the electrical signal which is substantially independent of the value of the electrical signal.

57. A protective relaying method for use in an electrical power system with electrical apparatus to be protected having a thermal time constant, and with a circuit breaker for connecting and, in response to an electrical trip, disconnecting the electrical apparatus which is energizable with an AC voltage that has a value of actual volts-per-Hertz, the method comprising the steps of:
  generating an elecrrical signal in response to the AC voltage so that the electrical signal changes in magnitude from an initial value to an accumulated value generally representative of heating of the apparatus to be protected when the actual volts-per-Hertz exceeds a preselected pickup level of volts-per-Hertz;
  producing an electrical trip for the circuit breaker when the accumulated value reaches a predetermined amount; and
  upon an occurrence of the electrical trip, returning the electrical signal from its accumulated value during a reset tire interval related to the thermal time constant of the apparatus to be protected to allow cooling of the apparatus, the electrical signal generally representing the cooling during the reset time interval.

58. A protective relay for use with electrical apparatus to be protected that is energizable with an AC voltage that has a varying value of actual volts-per-Hertz, and for use with a circuit breaker for connecting and, in response to an electrical trip, disconnecting the electrical apparatus, and with means for sensing the AC voltage to produce an AC output, the protective relay comprising:
  means responsive to the AC output for generating an electrical signal that begins at an initial value and changes in value generally representing heating of the apparatus to be protected when the actual volts-per-Hertz exceeds a preselected pickup level of volts-per-Hertz for the relay and for generating a trip output for initiating the electrical trip when the electrical signal reaches a predetermined value; and
  means for supplying a reset control signal, said means for generating including means responsive to the reset control signal before a trip output occurs for resetting the electrical signal in value over a first reset time period provided the value of actual volts-per-Hertz becomes and remains less than the pickup level of volts-per-Hertz until the initial value is reached, and responsive to the reset control signal upon an occurrence of the trip output for resetting the electrical signal to the initial value over a second reset time period which exceeds the first reset time period in length.

59. A protective relay as set forth in claim 58 wherein the first reset time period varies as a function of the value of the electrical signal attained when resetting begins.

60. A protective relay for use with electrical apparatus to be protected that is energizable with an AC voltage having a varying value of actual volts-per-Hertz, and with means for sensing the AC voltage to produce an AC output, the protective relay comprising:
  means responsive to the AC output for generatig an electrical signal that begins at an initial value and changes in value generally representing heating of the apparatus to be protected when the actual volts-per-Hertz exceeds a preselected pickup level of volts-per-Hertz for the relay; and
  means for supplying a reset control signal, said means for generating including means responsive to the reset control signal when the value of actual volts-per-Hertz becomes less than the pickup level of volts-per-Hertz for resetting the electrical signal in value over a reset time period that is a direct function of the amount of heating which the value of the electrical signal represents when resetting begins provided the level ff actual volts-per-Hertz is less than the pickup level of volts-per-Hertz throughout the reset time period until the initial value of the electrical signal is reached.

61. A protective relay as set forth in claim 60 wherein said means for supplying the reset control signal includes adjustable means for establishing a rate of change of the electrical signal when resetting in value, which rate of change is substantially independent of the value of the electrical signal attained when resetting begins.

* * * * *

UNITED STATES PATENT AND TRADEMARK OFFICE
CERTIFICATE OF CORRECTION

PATENT NO. : 4,788,619

DATED : November 29, 1988

INVENTOR(S) : Matthew J. Ott and Timothy M. Wilkerson

It is certified that error appears in the above—identified patent and that said Letters Patent is hereby corrected as shown below:

```
     Column 24, claim 3, lines 26 and 27, "period, which"
should read --period between zero crossings, which--; lines
28 and 29, "period between zero crossings during" should
read --period during--.
     Column 25, claim 8, line 10, "rest" should read
--reset--; claim 12, line 42, "butput" should read --output--.
     Column 33, claim 57, line 15, "tire interval"
should read --time interval--.
     Column 34, claim 60, line 31, "level ff" should
read --level of--.
```

Signed and Sealed this

Fifteenth Day of August, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,788,619
DATED : November 29, 1988
INVENTOR(S) : Matthew J. Ott and Timothy M. Wilkerson It is certified that error appears in the above—identified patent and that said Letters Patent is hereby corrected as shown below:

In the drawings, Sheets 9-14, Figures 12-18, the following notice should appear at the bottom of each sheet: -- © BASLER ELECTRIC CO. 1987--.

Signed and Sealed this

Fifth Day of December, 1989

Attest:

JEFFREY M. SAMUELS

*Attesting Officer*      *Acting Commissioner of Patents and Trademarks*